United States Patent
Shiga

(10) Patent No.: US 8,677,096 B2
(45) Date of Patent: *Mar. 18, 2014

(54) STORAGE SYSTEM AND STORAGE CONTROL METHOD THAT COMPRESS AND STORE DATA ELEMENTS

(75) Inventor: Kenta Shiga, Yokohama (JP)

(73) Assignee: Hitachi, Ltd., Tokyo (JP)

(\*) Notice: Subject to any disclaimer, the term of this patent is extended or adjusted under 35 U.S.C. 154(b) by 0 days.

This patent is subject to a terminal disclaimer.

(21) Appl. No.: 13/611,100

(22) Filed: Sep. 12, 2012

(65) Prior Publication Data

US 2013/0007360 A1 Jan. 3, 2013

Related U.S. Application Data

(63) Continuation of application No. 13/335,644, filed on Dec. 22, 2011, now Pat. No. 8,291,189, which is a continuation of application No. 12/310,107, filed as application No. PCT/JP2009/000372 on Jan. 30, 2009, now Pat. No. 8,108,646.

(51) Int. Cl.
*G06F 12/00* (2006.01)
(52) U.S. Cl.
USPC .......................... 711/170; 711/114; 711/173
(58) Field of Classification Search
None
See application file for complete search history.

(56) References Cited

U.S. PATENT DOCUMENTS

| | | | |
|---|---|---|---|
| 8,108,646 B2 | 1/2012 | Shiga | |
| 8,291,189 B2 * | 10/2012 | Shiga | 711/170 |
| 2006/0212625 A1 | 9/2006 | Nakagawa et al. | |
| 2008/0052329 A1 | 2/2008 | Dodge et al. | |
| 2008/0263261 A1 | 10/2008 | Fujimoto et al. | |
| 2009/0144496 A1 | 6/2009 | Kawaguchi | |

FOREIGN PATENT DOCUMENTS

| | | |
|---|---|---|
| EP | 0 747 806 A2 | 12/1996 |
| EP | 0 747 806 A3 | 8/1997 |
| EP | 1 895 394 A2 | 3/2008 |
| EP | 1 895 394 A3 | 8/2009 |
| JP | 2000-357112 | 12/2000 |
| JP | 2004-078787 | 3/2004 |
| JP | 2006-259962 | 9/2006 |
| JP | 2008-052730 A | 3/2008 |
| JP | 2008-269338 | 11/2008 |

OTHER PUBLICATIONS

International Search Report for PCT/JP2009/000372, mailed Oct. 1, 2009.
Office Action, issued from Japanese Patent Office, in corresponding Japanese Patent Application No. 2011-514952, dated Jul. 10, 2012, pp. 1-3.

\* cited by examiner

*Primary Examiner* — Shawn X Gu
(74) *Attorney, Agent, or Firm* — Mattingly & Malur, PC

(57) ABSTRACT

A pool is formed based on a plurality of storage devices. This pool is constituted by a plurality of real pages. Real pages of different lengths are included in this plurality of real pages. Among a plurality of virtual pages which make up a virtual volume, a controller compresses a write data element for a write destination virtual page, selects a real page of a real page length based on the data length of a data unit including the compressed write data element, and allocates the selected real page to the write destination virtual page.

8 Claims, 29 Drawing Sheets

Fig.19

| VIRTUAL PAGE ID | REAL PAGE ID LIST | COMPRESSED DATA LENGTH |
|---|---|---|
| VP0 | RP10240, RP20480 | 750kB |
| VP1 | RP10241 | 346kB |
| VP2 | N/A | N/A |
| ... | ... | ... |

Fig.21

| VIRTUAL PAGE ID | REAL PAGE ID | COMPRESSED DATA LENGTH | STATE |
|---|---|---|---|
| VP0 | RP0 | 750kB | compressed |
| VP1 | RP10240 | N/A | uncompressed |
| VP2 | N/A | N/A | N/A |
| ... | ... | ... | ... |

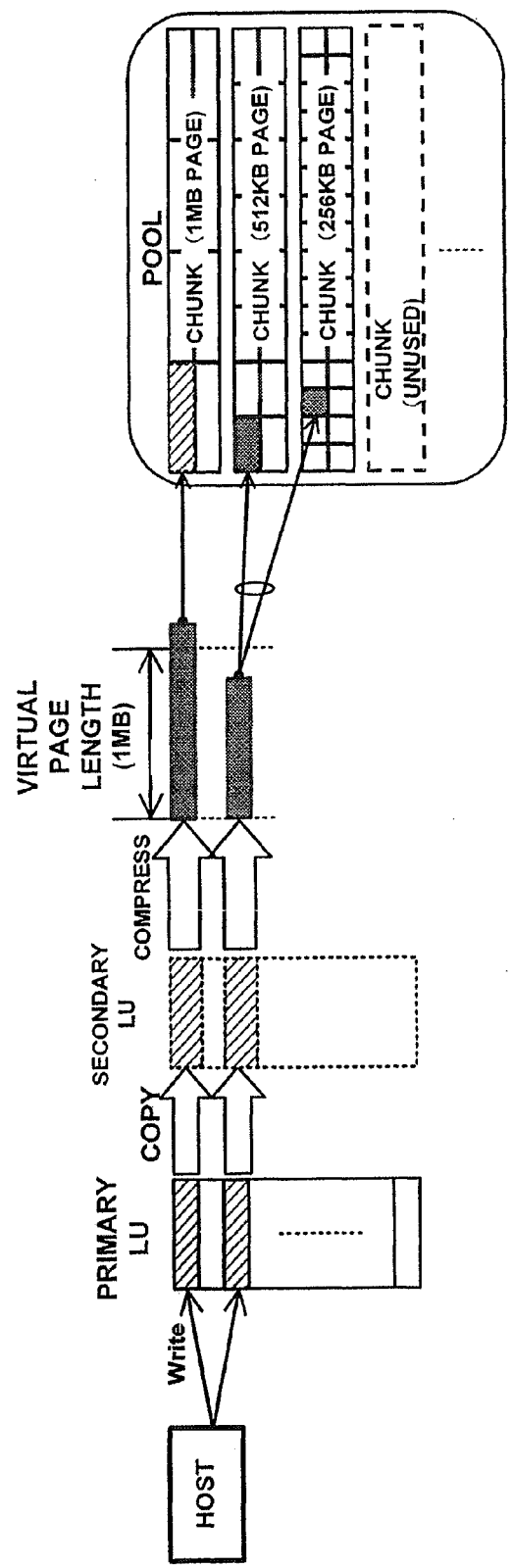

Fig.28A
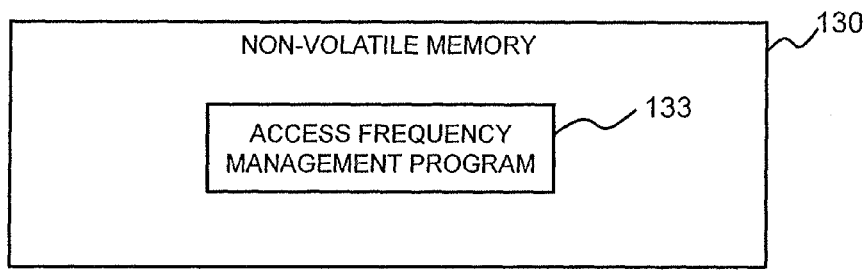
Fig.28B
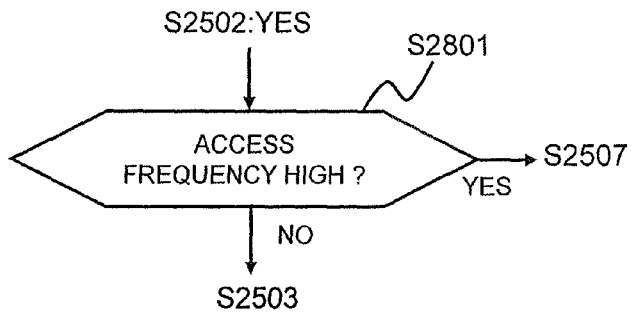
Fig.28C

STORAGE SYSTEM AND STORAGE CONTROL METHOD THAT COMPRESS AND STORE DATA ELEMENTS

CROSS-REFERENCE TO RELATED APPLICATIONS

This application is a Continuation of U.S. patent application Ser. No. 13/335,644, filed Dec. 22, 2011, (now U.S. Pat. No. 8,291,189) which is a Continuation of U.S. patent application Ser. No. 12/310,107 filed Feb. 11, 2009, (now U.S. Pat. No. 8,108,646). The present application claims priority from U.S. patent application Ser. No. 13/335,664 filed Dec. 22, 2011, (now U.S. Pat. No. 8,291,189), which claims priority from U.S. patent application Ser. No. 12/310,107 filed Feb. 11, 2009, (now U.S. Pat. No. 8,108,646), which claims priority from PCT application PCT/JP2009/000372 filed on Jan. 30, 2009, including the specification, drawings and abstract is incorporated herein by reference in its entirety.

TECHNICAL FIELD

The present invention generally relates to storage control which compresses and stores data elements.

BACKGROUND ART

For example, the storage system disclosed in Patent Citation 1 is known as a storage system which compresses and stores data elements.

PATENT CITATION 1

Japanese Laid-Open Patent Publication 2006-259962.

DISCLOSURE OF INVENTION

Technical Problem

A storage system generally comprises a controller and a group of storage devices. A data element is compressed by the controller, and the compressed data element is stored in a storage space which is based on the group of storage devices.

Generally, the length of a data element after it has been compressed is different if the method of compression is different, or, even if the method of compression is the same, still is different according to the contents of the data element before compression. Due to this, the amount of management information which is stored in a memory provided to the controller might be become large. The reason why is that, in this management information, for example, it is necessary to include information elements which specify the positions and the lengths of the empty storage regions in the storage space, and the number of these information elements increases as the number of empty storage regions becomes larger. Furthermore, in this management information, for example, it is necessary to include information elements which specify the storage positions and the lengths of the data elements which have been compressed, and the number of these information elements also increases as the number of compressed data elements becomes larger.

As one method of reducing the probability that the amount of management information may become large, a method has been contemplated of dividing the storage space into storage regions of a fixed length (hereinafter termed fixed size regions), and of storing one data element which has been compressed in one fixed size region; in other words, of performing management by units of these fixed size regions.

However, with this method, if the length of the fixed size regions is long, there is a possibility that a long empty region (i.e. the region other than that occupied by a compressed data element) will remain within one fixed size region, and consequently the capacity efficiency might be bad. On the other hand, if the length of the fixed size regions is short, although probably it will be possible that the length of the empty region which exists within one fixed size region becomes short, the number of the fixed size regions which must be managed becomes large. Due to this, if there is a limit upon the amount of management information, if the length of the fixed size regions is short, the total length of the group of fixed size regions which can be managed is short, and consequently the data length which can be stored in the storage space (i.e. the total length of the compressed data elements) is also short. In other words, the capacity scalability might deteriorate.

Thus, an object of the present invention is to provide high capacity efficiency in a storage system in which data elements are compressed, while also ensuring that the capacity scalability does not decrease.

Technical Solution

A pool is provided on the basis of a plurality of storage devices which are included in a storage system. This pool consists of a plurality of real pages (physical storage regions). Real pages of different lengths are included in this plurality of real pages.

A controller comprises a compression part, a pool management part, and an I/O processing part.

A compression part compresses a write data element for a write destination virtual page, among a plurality of virtual pages (virtual storage regions) which a virtual volume comprises.

A pool management part selects a real page which satisfies (Condition A) and (Condition B) described below, and allocates that selected real page to the write destination virtual page:

(Condition A): the length of the real page is based on the length of a data unit having the compressed write data element;

(Condition B): the real page is not allocated to any virtual page.

An I/O processing part stores the above described data unit in the real page which has been selected.

The data unit may consist of the compressed write data element itself, or may consist of specific information and the compressed write data element. This specific information may be, for example, a data integrity code (for example an ECC (Error Correcting Code)).

Here, the "data element" (for example, the write data element) is an element for one virtual page, and may have, for example, the same length as the virtual page length. By the data element being compressed, it becomes a data element which is shorter than the virtual page length (sometimes, due to the contents of the data element and so on, this may not be the case).

At least one of the compression part, the pool management part, and the I/O processing part may be constituted as hardware, a computer program, or a combination thereof (for example, one portion may be implemented by a computer program while the remainder is implemented in hardware).

BRIEF DESCRIPTION OF DRAWINGS

FIG. 19 is a structural diagram of a virtual page table 1900 in a third embodiment of the present invention.

FIG. 21 is a structural diagram of a virtual page table 2137 in a fourth embodiment of the present invention.

FIG. 27 shows an example of a summary of an embodiment in which, in a combination of the first through the third embodiments of the present invention, a virtual LU is a secondary LU.

FIG. 28A is a structural diagram of the virtual page table 2137 in a variant of the fourth embodiment of the present invention.

FIG. 28B shows an access frequency management program which is stored in a non-volatile memory 130, in this variant of the fourth embodiment of the present invention.

FIG. 28C shows locations where the asynchronous compression processing is changed, in this variant embodiment of the fourth embodiment of the present invention.

EXPLANATION OF THE REFERENCE SYMBOLS

110: storage system

BEST MODE FOR CARRYING OUT THE INVENTION

Several embodiments of the present invention will now be explained with reference to the drawings. It should be understood that, in the following, when elements of the same type are not particularly distinguished, only the same basic number is used, while, when elements of the same type are to be distinguished, combinations of the basic number and subsidiary reference symbols will be used.

Mode for the Invention 1

Figure 26:
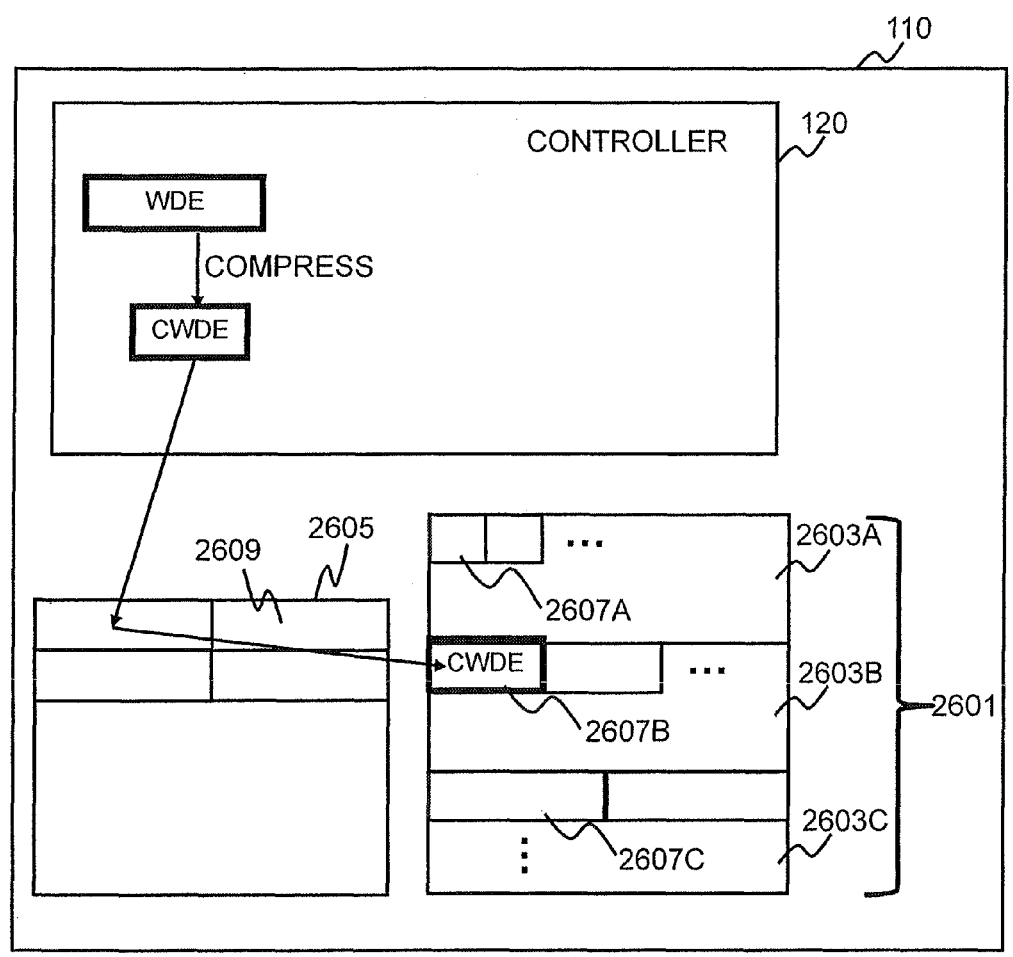
FIG. 26 shows a summary of the first embodiment of the present invention.

FIG. 26 shows a summary of the first embodiment of the present invention.

A storage system 110 comprises a controller 120 and a pool 2601.

The pool 2601 consists of a plurality of pool sub-regions 2603 (for example three pool sub-regions 2603A through 2603C). Each of these pool sub-regions 2603 comprises a plurality of real pages 2607. The lengths of these real pages 2607 (i.e. the real page lengths) are defined for each of the pool sub-regions 2603. For example, the lengths of the real pages 2607B in the pool sub-region 2603B may be longer than those of the real pages 2607A in the pool region 2603A, and the lengths of the real pages 2607C in the pool sub-region 2603C may be longer than those of the real pages 2607B. All of the real pages in one pool sub-region 2603 are the same length. The pool 2601 is a physical storage space based on a plurality of HDDs (Hard Disk Drives), and, for this reason, each of the real pages 2607 is a physical storage region.

The controller 120 supplies virtual LUs (Logical Units) 2605 to a host. Each of these virtual LUs 2605 consists of a plurality of virtual pages 2609. The virtual LUs 2605 are virtual logical volumes (i.e., volumes which are not based on HDDs). For this reason, each of the virtual pages 2609 is a virtual storage region. All of the virtual pages 2609 in one virtual LU 2605 are the same length. The maximum length of a real page 2607 may be, for example, the same as the length of a virtual page 2609.

In the following, a summary of the processing performed in the first embodiment will be explained.

Upon receipt of a write request from a host, the controller 120 performs the following processing for each write data element (abbreviated in the figure as "WDE" for the convenience of illustration) (to put it in another manner, for each virtual page which belongs to a write range specified from this write request). That is, the controller 120 compresses the write data element. Next, the controller 120 selects a real page 2607 whose length is based on the length of the data unit included in this compressed write data element (abbreviated in the figure as "CWDE" for the convenience of illustration), and which is a real page 2607 which is not allocated to any virtual page 2609 (in other words, an unused real page). In concrete terms, for example, the controller 120 selects a real page 2607 of a length which satisfies the following two conditions (a) and (b):

(a) greater than or equal to the length of the data unit;
(b) the difference from the length of this data unit is a minimum.

According to the example in FIG. 26, since the length of the data unit is the same as the length of the real page 2607B, accordingly the real page 2607B is selected. And the controller 120 stores this data unit in the real page 2607B which has been selected. The data unit may be the compressed write data element itself, or may consist of the compressed write data element with a data integrity code (for example an ECC (Error Correcting Code)) appended thereto. By appending a data integrity code to the compressed write data element, it is possible to prevent the data error of the compressed write data element.

In the following, the first embodiment of the present invention will be explained in detail. It should be understood that, in the following, for the convenience of explanation, the data units will be supposed to be compressed data elements themselves.

Figure 1:
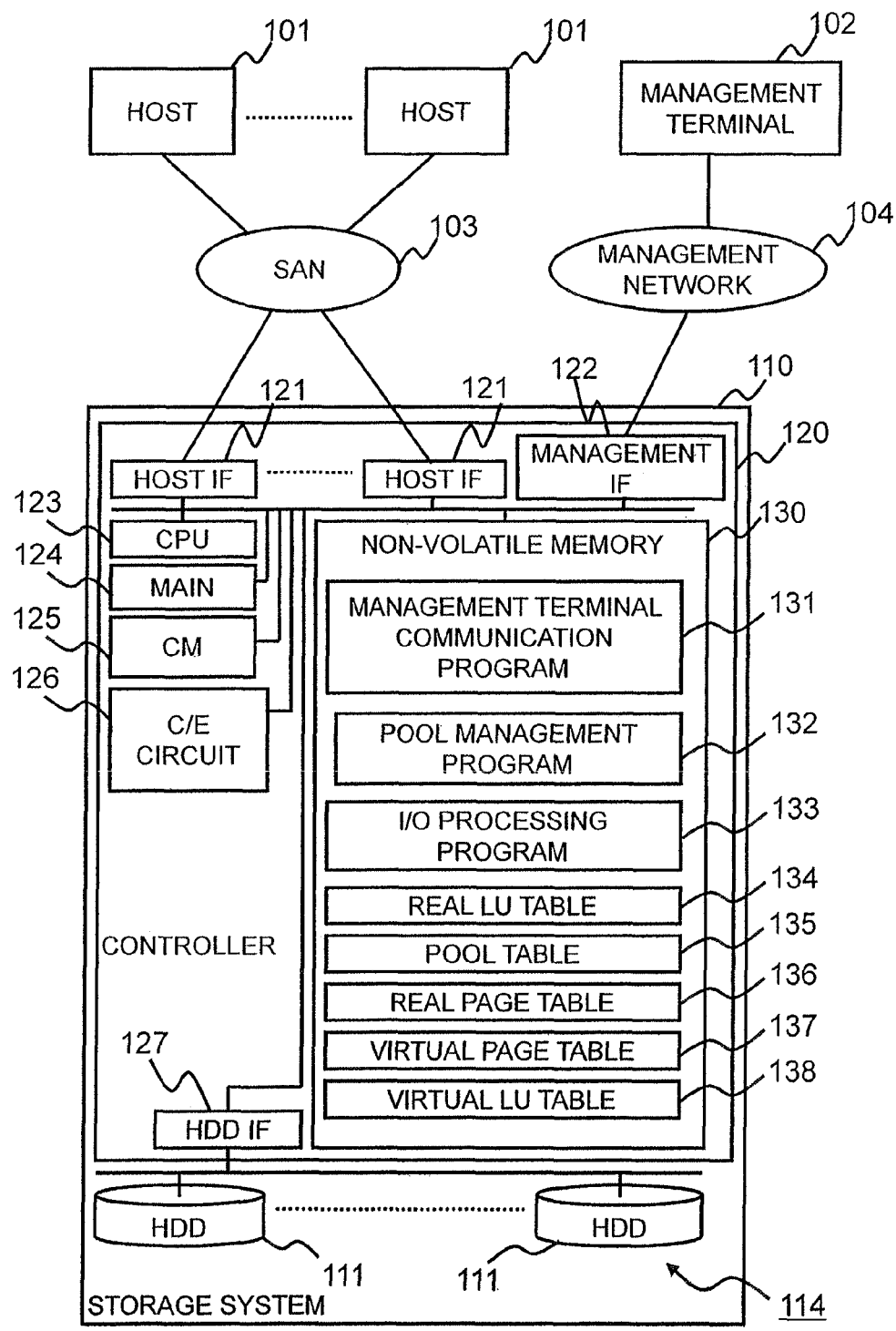
FIG. 1 is a structural diagram of a computer system according to a first embodiment of the present invention.

FIG. 1 is a structural diagram of a computer system according to the first embodiment of the present invention.

A plurality of hosts 101, and the storage system 110, are connected to a first communication network 103, which may for example be a SAN (Storage Area Network). Moreover, a management terminal 102 and the storage system 110 are connected to a second communication network, for example a management network 104 (which may, for example, be a LAN (Local Area Network)).

The hosts 101 are computers which issue I/O requests (write requests or read requests) to the storage system 110. The management terminal 102 is a terminal for managing the storage system 110.

The storage system 110 comprises a controller 120 and a group 114 of storage devices. The storage device group 114 comprises a plurality of HDDs 111. It should be understood that, instead of HDDs 111, it would also be acceptable to utilize physical storage devices of other types, for example flash memory devices or the like.

The controller 120 receives an I/O request issued from a host 100, and accesses some one or more of the HDDs 111 while processing this I/O request. This controller 120 comprises a plurality of host IFs 121, a management IF 122, a CPU 123, a main memory (MAIN) 124, a cache memory (CM) 125, a compression and expansion circuit (C/E circuit) 126, a non-volatile memory 130, and an HDD IF 127.

The host IFs 121 are interface circuits for communication with external devices, such as the hosts 101 and so on.

The management IF 122 is an interface circuit for communicating with external devices such as the management terminal 102 and so on, via the management network 104.

The HDD IF 127 is an interface circuit for communication with the HDDs 111.

The cache memory 125 may be, for example, a volatile memory. Data which is a subject for being written according to a write request which has been received from a host 101, and data which is a subject for being read according to a request which has been received from a host 101, are temporarily stored in this memory 125.

The compression and expansion circuit 126 is a hardware circuit, and compresses or expands a data element which has been inputted, then outputting it. At least one of this compression and expansion could also be performed by the CPU 123 executing a computer program, instead of by hardware circuitry.

A management terminal communication program 131, a pool management program 132, an I/O processing program 133, a real LU table 134, a pool table 135, a real page table 136, a virtual page table 137, and a virtual LU table 138 are stored in the non-volatile memory 130. These computer programs which are stored in the non-volatile memory 130 are loaded into the main memory 124, and then are executed by the CPU 123. The management terminal communication program 131 is a program for communication with the management terminal 102 (in concrete terms, with a storage communication program 149 which will be described hereinafter). The pool management program 132 is a program for performing processing related to pool management such as selection of real pages and so on. The I/O processing program 133 is a program for performing processing related to I/O such as storing compressed data to a real page and so on. These various programs and tables will be described in detail hereinafter. In the following explanation, the processing which is described as being performed by computer programs is actually performed by the CPU which executes these computer programs.

Figure 2:
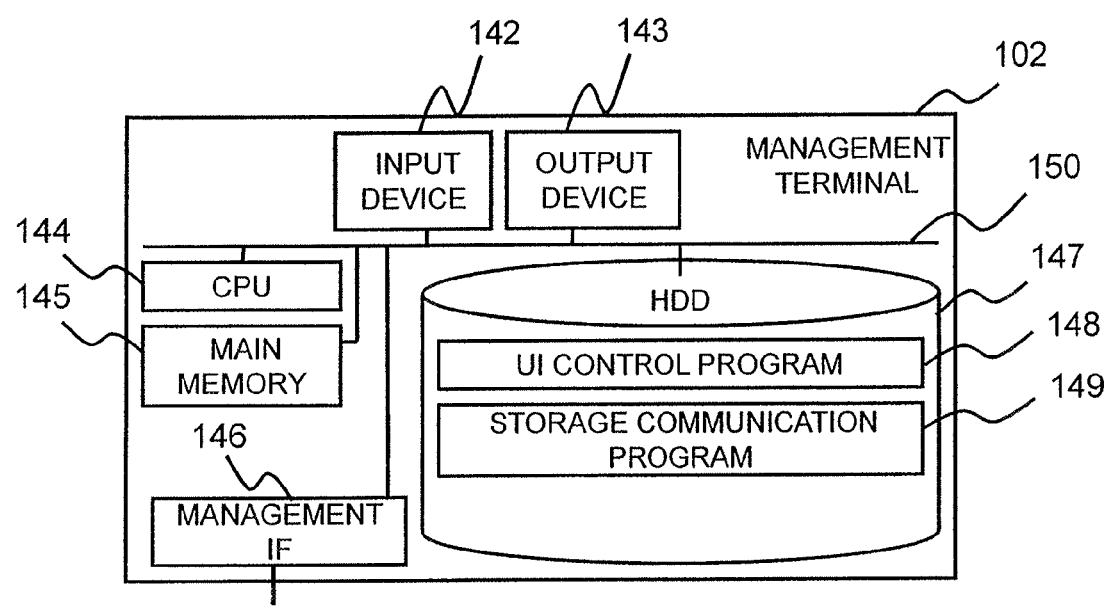
FIG. 2 is a figure showing the structure of a management terminal 102.

FIG. 2 is a figure showing the structure of the management terminal 102.

This management terminal 102 is a computer, and, for example, comprises an input device 142, an output device 143, a CPU 144, a main memory 145, a management IF 146, and an HDD 147. Each of these is connected to an internal bus 150.

The input device 142 is a pointing device (for example, a mouse) and/or a keyboard. The output device 143 is, for example, a display device.

A user interface control program (hereinafter termed the "UI control program") 148 and a storage communication program 149 are stored upon the HDD 147 (some other type of storage device would also be acceptable). These computer programs are loaded into the main memory 145, and, once loaded, they may be executed by the CPU 144. The management IF 146 is an interface circuit for communicating via the management network 104 with an external device, such as the storage system 110 and so on. The UI control program 148 is a program for displaying a GUI (Graphical User Interface) upon the output device 143. The storage communication program 149 is a computer program for communicating with the storage system 110. The UI control program 148 and the storage communication program 149 will be described in detail hereinafter.

Figure 3:
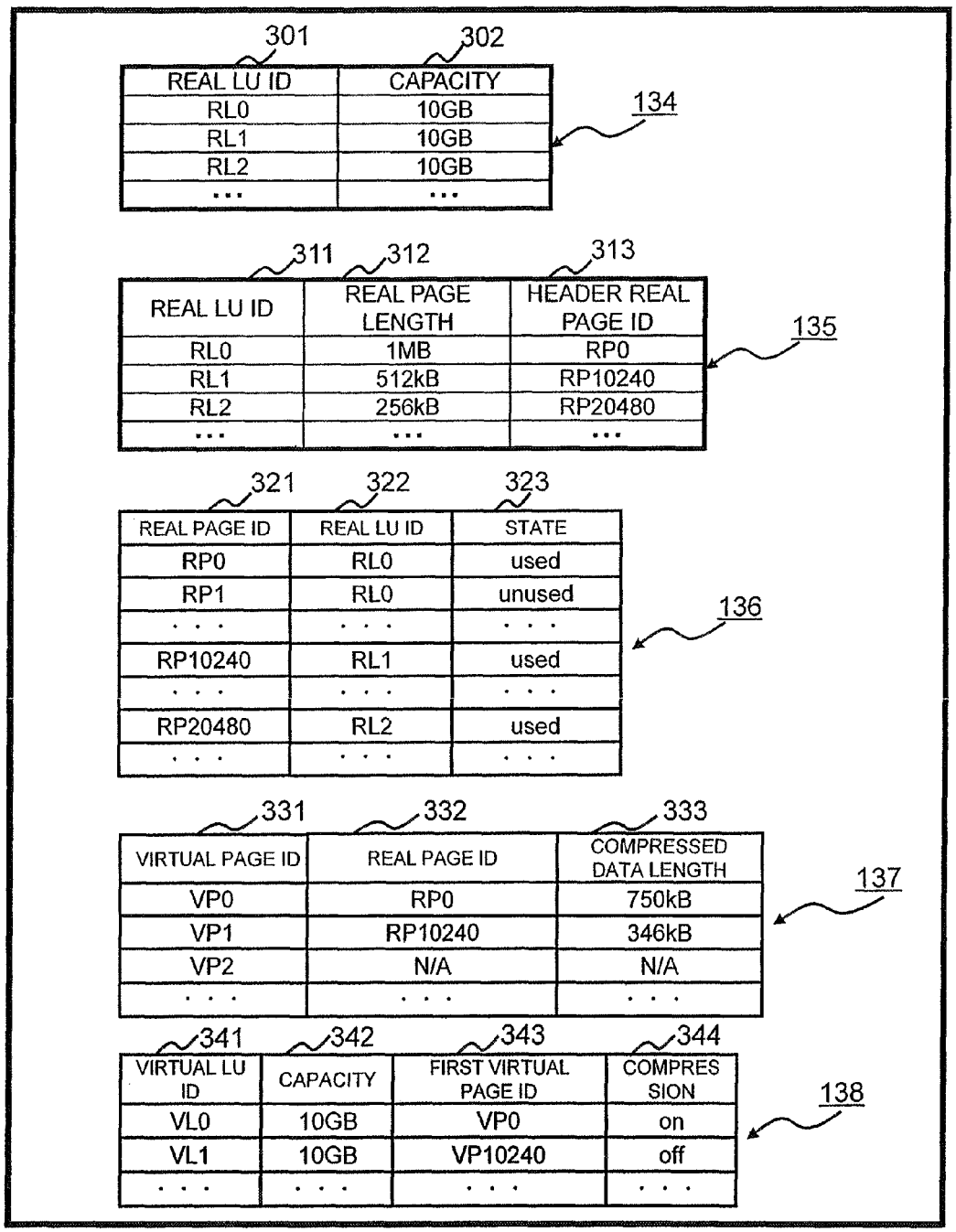
FIG. 3 is a structural diagram of various tables.

FIG. 3 is a structural diagram showing various tables.

The real LU table 134 is a table for managing information related to the real LUs. In concrete terms, this real LU table 134 has, for example, for each real LU, a field 301 in which the real LU ID is recorded, and a field 302 in which capacity information is recorded. To take one real LU as an example (in this paragraph, henceforward, this will be termed the "subject real LU"), information of various types is recorded in this table 134, as described below. A real LU ID is information which represents an identifier for the subject real LU. Capacity information is information which represents the storage capacity of the subject real LU. Here, a "real LU" is a logical volume which is based on an HDD 111, and in this aspect it differs from a virtual LU.

The pool table 135 is a table for managing information related to the pool. In concrete terms, for each of the real LUs which make up the pool, this pool table 135 may have, for example, a field 311 in which the real LU ID is recorded, a field 312 in which its real page length is recorded, and a field 313 in which the first real page ID is recorded. To take one of the real LUs which make up the pool 2601 as an example (in this paragraph, hereinafter, this will be termed the "subject real LU"), information of various types is recorded in this table 135, as described below. A real LU ID is information which represents an identifier for the subject real LU. Real page length information is information which represents the length of the real pages which make up the subject real LU. And a first real page ID is information which represents an identifier for the real page which is the first of the subject real LU. According to the following explanation, in this first embodiment, the pool sub-region 2603 which has been explained with reference to FIG. 26 is a real LU. The reason why is that a real page length is defined for each real LU. In this connection, the number of real pages which make up a subject real LU can be calculated based on the capacity of the subject real LU, and upon the real page length of the real pages of the subject real LU.

The real page table 136 is a table for managing information related to the real pages. In concrete terms, for example, for each of the real pages, the real page table 136 may have a field 321 in which its real page ID is recorded, a field 322 in which its real LU ID is recorded, and a field 323 in which its state information is recorded. To take one of the real pages as an example (in this paragraph, hereinafter, this will be termed the "subject real page"), information of various types is recorded in this table 136, as described below. The real page ID is information which represents an identifier for this subject real page. And a real LU ID is information which represents an identifier for the real LU which contains this subject real page. Moreover, state information is information which represents the state of this subject real page. For example, if this subject real page is allocated to some virtual page, the value of its state information is "used", whereas if this subject real page is not allocated to any virtual page, the value of its state information is "unused". It should be understood that, although information which represents the lengths of the real pages is not recorded in this table 136, the lengths of the real pages may be specified by referring to the pool table 135 with the real LU ID which corresponds to this real page as a key. The reason why is that the real page length information which corresponds to the real LU ID is recorded in the pool table 135.

The virtual page table 137 is a table for managing information related to the virtual pages. In concrete terms, for example, for each of the virtual pages, the virtual page table 137 may have a field 331 in which its virtual page ID is recorded, a field 332 in which its real page ID is recorded, and a field 333 in which its compressed data length information is recorded. To take one of the virtual pages as an example (in this paragraph, hereinafter, this will be termed the "subject virtual page"), information of various types is recorded in this table 137, as described below. The virtual page ID is information which represents an identifier for this subject virtual page. And the real page ID is information which represents an identifier for the real page which is allocated to this subject virtual page. It should be understood that, if no real page is allocated to the subject virtual page, the value of this real page ID is, for example, "N/A" (Not Assigned). Moreover, the compressed data length information is information which represents the length, after compression, of the data element which is stored in the real page which is allocated to the subject virtual page. If no real page is allocated to the subject virtual page, the value of this compressed data length information is, for example, "N/A". The compressed data length information is, for example, used for specifying, in the real page read processing and write processing described hereinafter, which portion of the data element which has been read the expansion processing should be applied to. For example, when the length of a data element which has been read from the real page which is allocated to the subject virtual page may be 512 kB and the value of the compressed data length information corresponding to the subject virtual page may represent 346 kB, it may be found that the expansion processing should be applied to the 346 kB of the data element portion among 512 kB of the data element.

The virtual LU table 138 is a table for managing information related to the virtual LUs. In concrete terms, this virtual LU table 138 has, for example, for each virtual LU, a field 341 in which the virtual LU ID is recorded, a field 342 in which capacity information is recorded, a field 343 in which the first virtual page ID is recorded, and a field 344 in which compression information is recorded. To take one virtual LU as an example (in this paragraph, henceforward, this will be termed the "subject virtual LU"), information of various types is recorded in this table 138, as described below. A virtual LU ID is information which represents an identifier for the subject virtual LU. Capacity information is information which represents the capacity defined for the subject virtual LU, in other words, information which represents the capacity of the subject virtual LU. A first virtual page ID is information which represents an identifier for the virtual page which is the first of the subject virtual LU. And compression information is information which represents whether or not the data which is stored in the subject virtual LU is compressed. In concrete terms, if, for example, the data which is stored in the subject virtual LU is compressed, the value of this compression information is "on", whereas if the data which is stored in the subject virtual LU is not compressed, the value of this compression information is "off".

Figure 4:
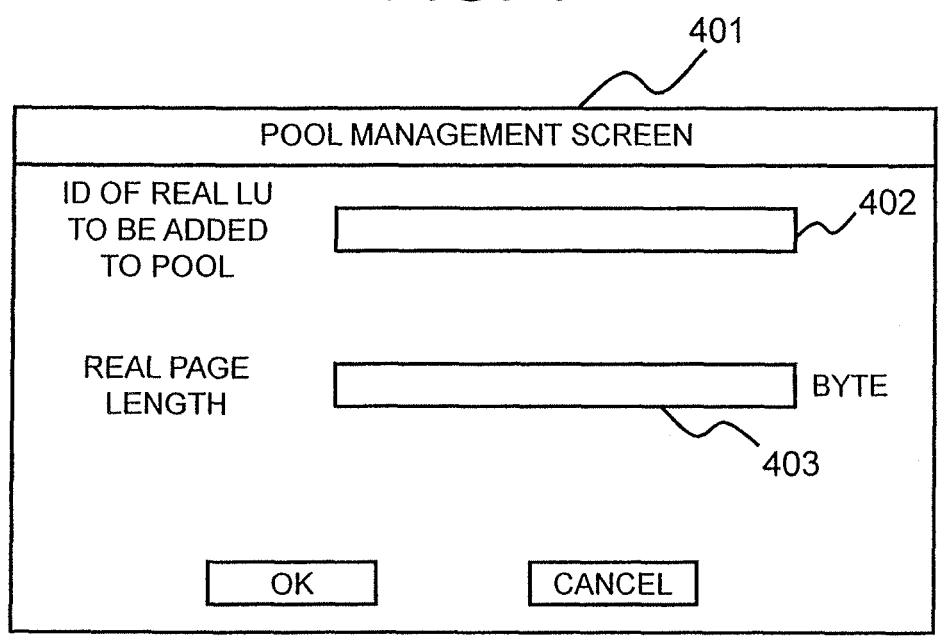
FIG. 4 shows an example of a pool management screen 401 in the first embodiment of the present invention.

Now, the lengths of real pages of real LUs within the pool 2601, may be, for example, set by the user of the management terminal 102 by using the pool management screen 401 shown in FIG. 4. Moreover, the capacities of the virtual LUs are set, and whether the data elements which are stored in these virtual LUs are compressed or not, may be, for example, set by the user of the management terminal 102 by using the virtual LU management screen 501 shown in FIG. 5.

FIG. 4 shows an example of this pool management screen 401.

This pool management screen 401 is a GUI that is displayed by the UI control program 149. Upon this pool management screen 401, there are provided an input field 402 for the ID of a real LU to be added to the pool 2601, and an input field 403 for input of the length of the real pages of this real LU which is to be added. Using the input device 142 shown in FIG. 2, the user inputs into the real LU ID input field 402 the ID of a real LU which is to be added, and he also inputs the length of the real pages of this real LU into the real page size input field 403. The real LU ID which is inputted may be, for example, any one of the plurality of real LU IDs which are already recorded in the real LU table 301. When an "OK" button is pressed by the user, the storage communication program 149 notifies to the storage system 110 information which represents the real LU ID which has been inputted into the input field 402 and the real page length which has been inputted into the input field 403. And, upon receipt of this information by the management terminal communication program 131 in the storage system 110, the pool management program 132 performs the following processing. That is, the pool management program 132 adds to the pool table 135 a record in which are recorded information which represents the real LU ID and the real page length information which were received by the management terminal communication program 131 (in other words, which were inputted from the user). Moreover, the pool management program 132 adds to the real page table 136 records which correspond to all of the real pages which make up the real LU which has been added to the pool 2601 (i.e. records which include their real page IDs and their real LU IDs).

Figure 5:
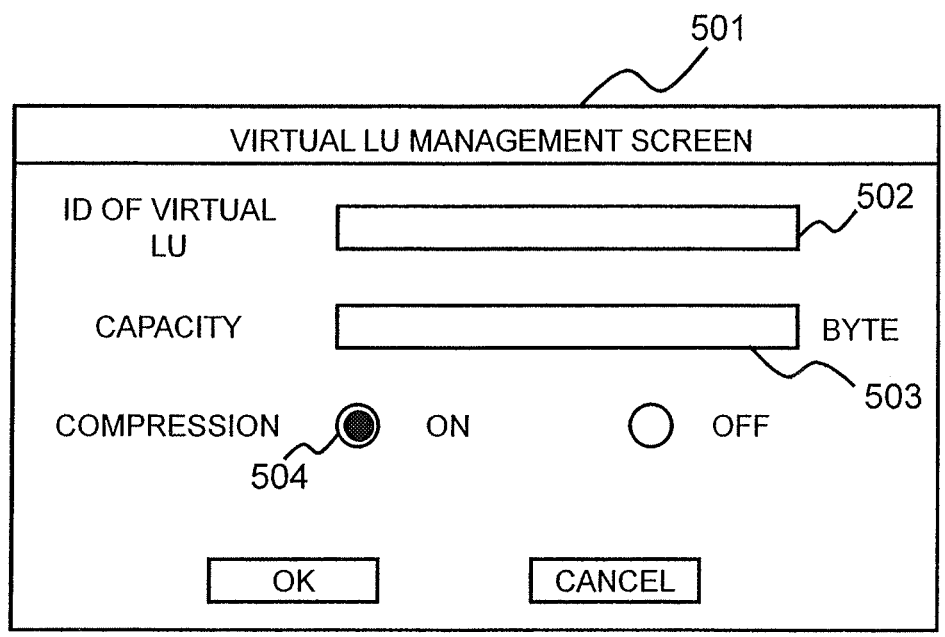
FIG. 5 shows an example of a virtual LU management screen 501.

FIG. 5 shows an example of the virtual LU management screen 501.

This virtual LU management screen 501 is a GUI that is displayed by the UI control program 149. Upon this virtual LU management screen 501, there are provided an input field 502 for the ID of a virtual LU, an input field 503 for input of the capacity of this virtual LU, and a selection button 504 for selecting whether or not the data stored in this virtual LU is compressed. Using the input device 142 shown in FIG. 2, the user inputs into the field 502 the desired ID of a virtual LU, and he also inputs the capacity of this virtual LU into the input field 503. Moreover, the user designates "compression on" or "compression off" with the selection button 504.

When the "OK" button is pressed by the user, the storage communication program 149 notifies to the storage system 110 information which represents the virtual LU ID which has been inputted into the input field 502 and the capacity which has been inputted into the input field 503, and information which corresponds to the selection button 504 which has been designated (i.e. "compression on" or "compression off"). And, upon receipt of this information by the management terminal communication program 131, the pool management program 132 performs the following processing. That is, the pool management program 132 adds to the virtual LU table 138 a record in which is recorded the information which was received by the management terminal communication program 131 (in other words, which was inputted from the user).

In the following, the processing performed in the first embodiment will be explained.

Figure 6:
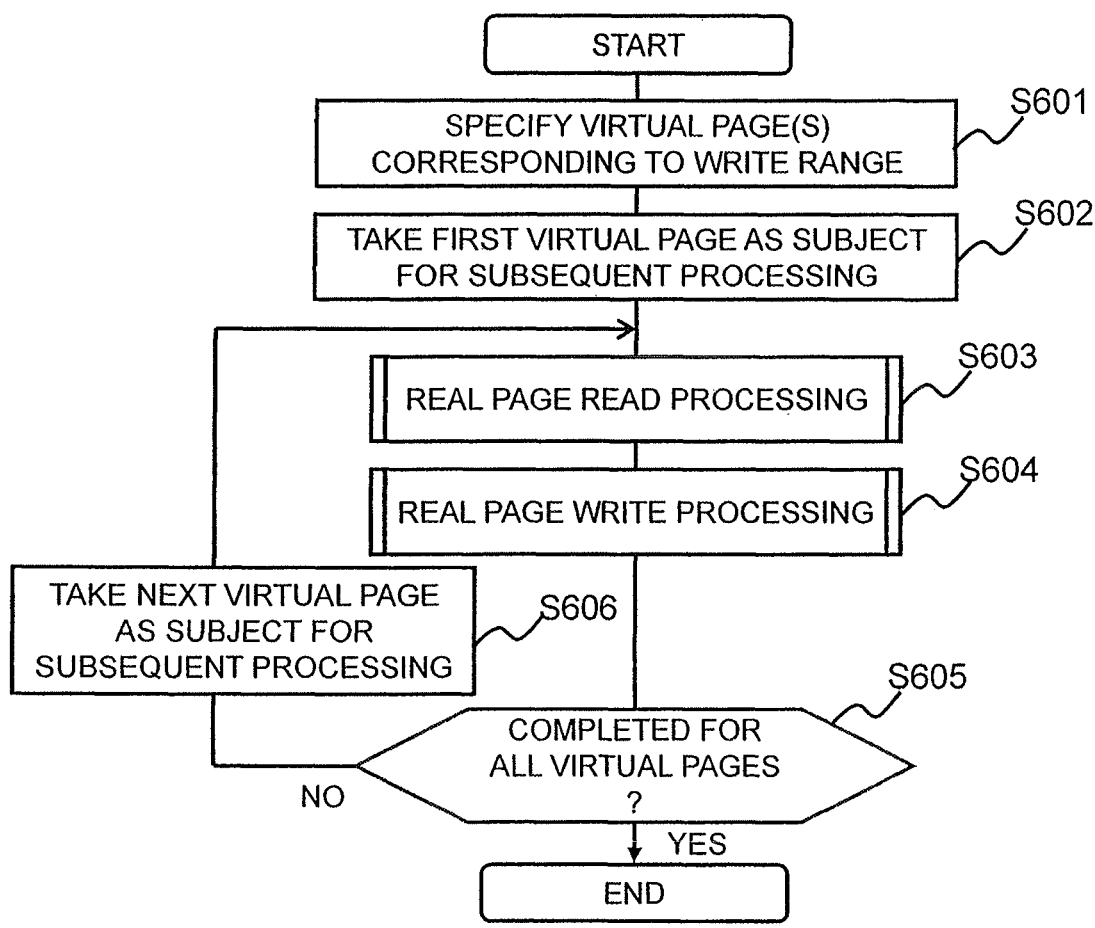
FIG. 6 is a flow chart for write processing.

FIG. 6 is a flow chart for write processing.

This write processing is processing which is executed if the LU which is designated by a write request received from a host 101 is a virtual LU, and if the value of the compression information which corresponds to this virtual LU is "on". In concrete terms, upon receipt of a write request, the pool management program 132 decides whether or not the LU identified from the LUN designated in this write request which has been received is a virtual LU, and whether or not the value of the compression information which corresponds to this virtual LU (i.e. the value which is recorded in the virtual LU table 138) is "on". If the result of this decision is affirmative, the write processing shown in FIG. 6 is started.

The pool management program 132 specifies the one or more virtual pages which correspond to the write range (for example to the LBA and the length of the write data) designated by the write request (step S601).

Next, among the one or more virtual pages which have been specified in the step S601, the pool management program 132 takes (step S602) the first virtual page as the subject for the following processing (in other words, the processing of the steps S603 through S605).

Next, the pool management program 132 performs real page read processing upon the virtual page which is the processing subject (step S603). This real page read processing will be described hereinafter with reference to FIG. 7.

Next, the pool management program 132 performs real page write processing upon the virtual page which is the processing subject (step S604). This real page write processing will be described hereinafter with reference to FIG. 8.

Next, the pool management program 132 decides whether or not processing of all of the virtual pages which correspond to the write range specified in the step S601 has been completed (step S605). If the result of this decision in the step S605 is negative (NO in the step S605), the pool management program 132 takes as the subject for the subsequent processing (in other words, takes to be processed by the steps S603 through S605) the next virtual page, among those virtual pages which have not yet been processed (step S606), and performs the step S603 for this virtual page which is the processing subject. On the other hand, if the result of the decision in the step S605 is affirmative (YES in the step S605), this write processing terminates.

Figure 7:
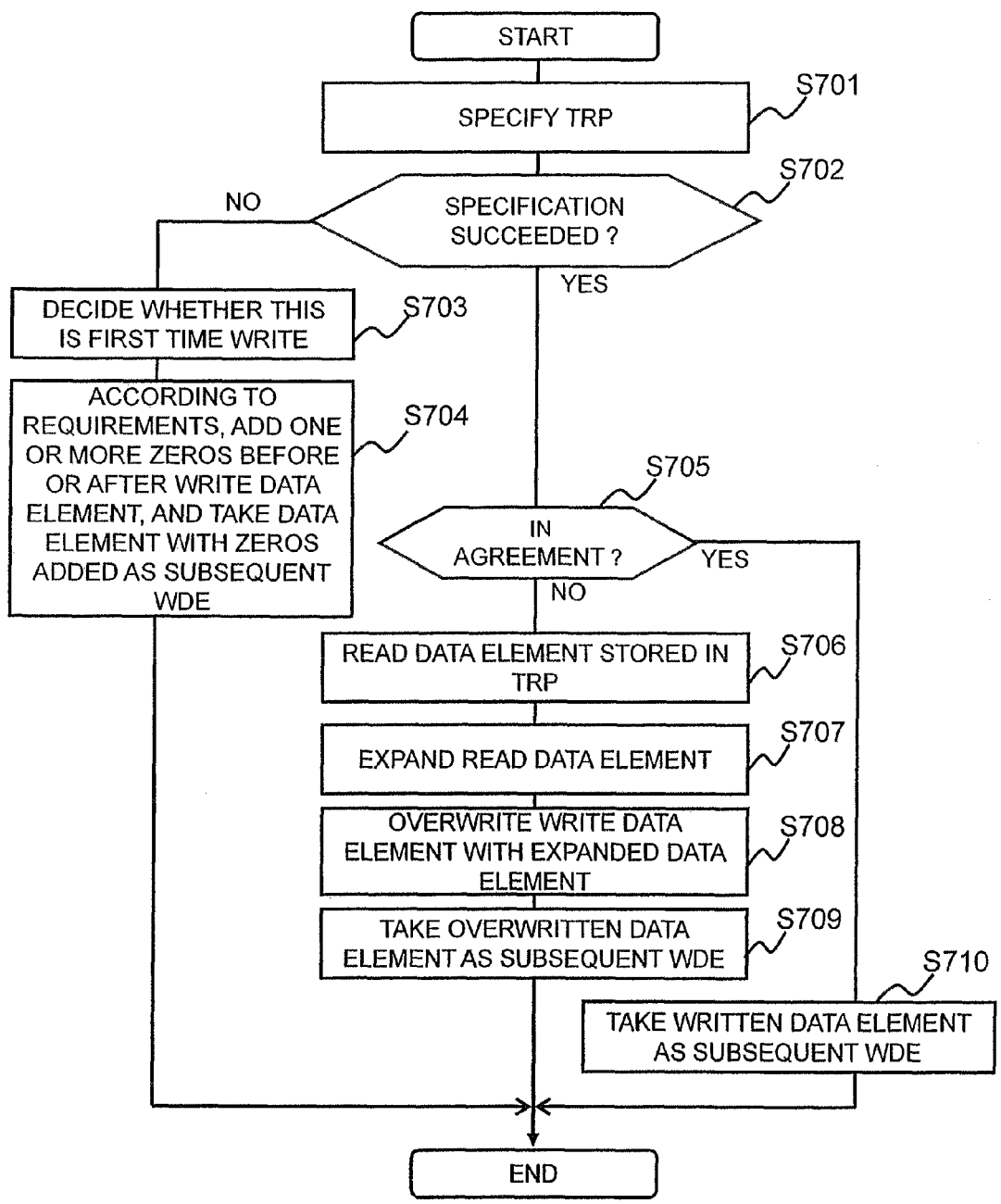
FIG. 7 is a flow chart of real page read processing in this first embodiment of the present invention.

FIG. 7 is a flow chart for real page read processing.

This real page read processing is the processing which is performed in the step S603 of FIG. 6.

The pool management program 132 then specifies the real page corresponding to the virtual page which is the processing subject (in FIGS. 7 and 8, this is abbreviated as the Target Real Page "TRP") (step S701). If the pool management program 132 succeeds in this specification of the real page in the step S701 (YES in step S702), it performs the processing of a step S705 and subsequent steps, on the other hand, if it fails in this specification of the real page (NO in the step S702), it performs the processing of steps S703 and S704.

If there has been a failure in the specification of the real page in the step S702 (NO in the step S702), the pool management program 132 decides that this is the first time of writing (step S703), adds one or more "0"s, if needed, before and/or after the data element (a data element in the cache memory 125) written upon the virtual page which is the processing subject, and takes (step S704) this data element to which zeros have been added to be the subject for the subsequent processing (write data element). In other words, if the data element which is to be written to the virtual page which is the processing subject is shorter than the virtual page length, by adding data having no meaning such as zero or the like (in concrete terms, bit data specifying "0") before and/or after this data element in this step S704, processing is performed by taking the length of this data element as a whole to be the same as the lengths of the virtual pages.

On the other hand, if the specification of the real page in the step S702 has been successful (YES in the step S702), the pool management program 132 takes a decision as to whether or not the length of the data element written upon the virtual page which is the processing subject is the same as the virtual page length (step S705). If the result of the decision in this step S705 is negative (NO in the step S705), the processing of the step S706 and subsequent steps is executed. On the other hand, if the result of the decision in this step S705 is affirmative (YES in the step S705), the pool management program 132 takes the data element itself which is written upon the virtual page which is the processing subject as being the subsequent processing subject (i.e. the write data element) (step S710), and then this processing sequence terminates.

If the result of the decision in this step S705 is negative (NO in the step S705), the I/O processing program 133 reads the data element stored upon the real page which was found in the step S701 (step S706). Next, the pool management program 132 inputs this data element which has been read to the compression and expansion circuit 126, and the compression and expansion circuit 126 performs expansion upon this compressed data element (in other words, the data element which has been read) (step S707). And the I/O processing program 133 overwrites the data element written upon the virtual page which is the processing subject with this data element which has been expanded (step S708). Moreover, the pool management program 132 takes the data element which was overwritten in the step S708 as being the subject (i.e. the write data element) for the subsequent processing (step S709).

Figure 9:
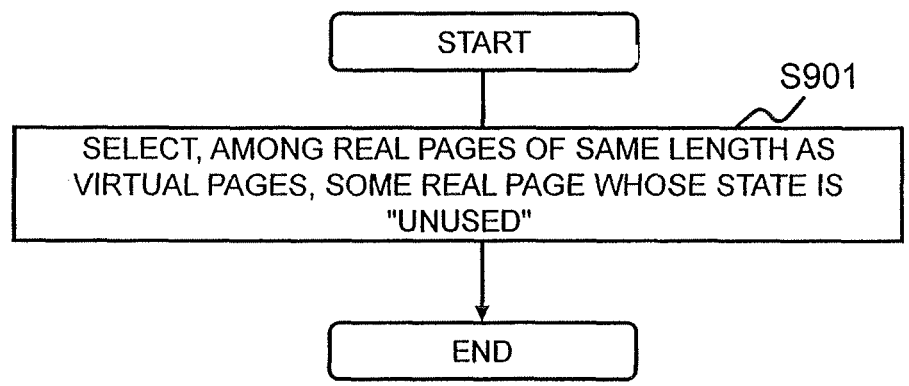
FIG. 9 is a flow chart of default length real page selection processing.
Figure 10:
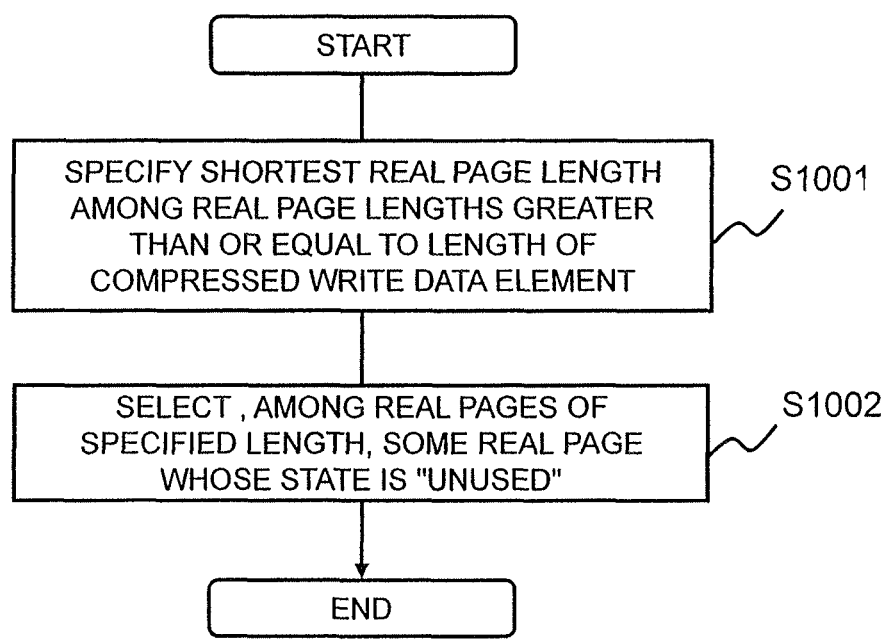
FIG. 10 is a flow chart of real page selection processing.

In the following, in the explanation of FIGS. 8 through 10, the data which results from the steps S704, S709, and S710 will be termed the "write data element". The write data element which results from the step S704 either is the data element itself written in the virtual page which is the processing subject (in other words, the original data element), or is a data element which consists of this data element and zero added before and/or after it. And the write data element which results from the step S709 is data in which the data element written on the virtual page which is the processing subject (in other words, the original data element) has been overwritten with the data element which has been read from the real page specified in the step S701 and expanded. Moreover, the write data element which is the processing result of the step S710 is the write data element itself written upon the virtual page which is the processing subject (in other words, the original data element).

Figure 8:
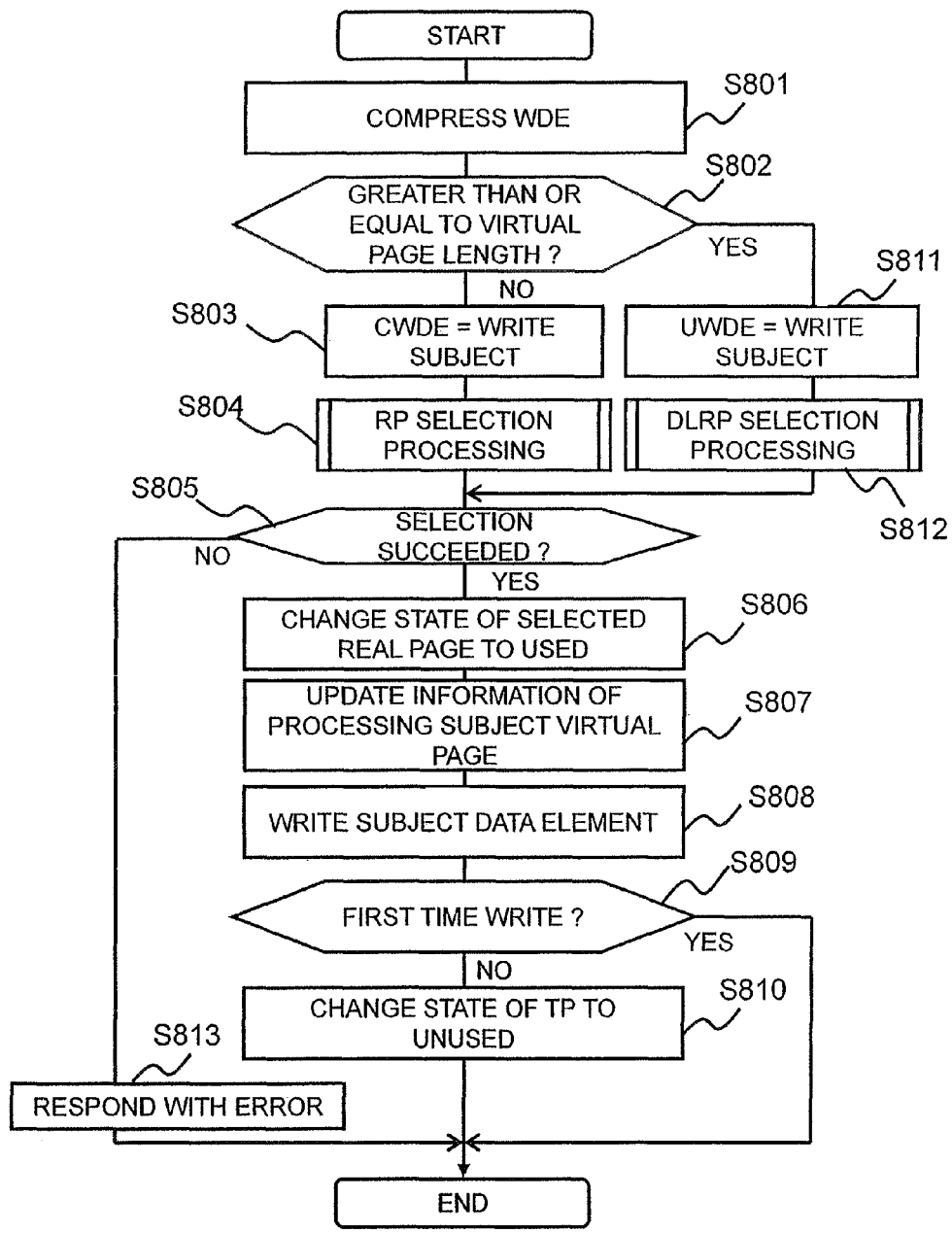
FIG. 8 is a flow chart of real page write processing in this first embodiment of the present invention.

FIG. 8 is a flow chart for real page write processing.

This real page write processing is the processing which is performed in the step S604 of FIG. 6.

The pool management program 132 inputs the write data element (WDE) to the compression and expansion circuit 126, and the compression and expansion circuit 126 compresses the write data element (step S801). As a result, for example, both the write data element which was inputted to the circuit 126 (the write data element before compression (abbreviated in the figure as "UWDE")) and the write data element which has been compressed by the circuit 126 (abbreviated in the figure as "CWDE") come to be present in the cache memory 125.

Next, the pool management program 132 decides whether or not the length of the write data element which was compressed in the step S801 is greater than or equal to the virtual page length (step S802).

If the result of the decision in the step S802 is negative (NO in the step S802), the pool management program 132 takes the compressed write data element as the write subject (step S803). Next, the pool management program 132 performs the real page selection processing shown in FIG. 10 (abbreviated in the figure as "RP selection processing") (step S804). In other words, the pool management program 132 refers to the field 312 of the pool table 135, and specifies that real page length which is the shortest, among the real page lengths which are greater than or equal to the length of the compressed write data element (step S1001). Next, the pool management program 132 refers to the real page table 136, and selects a real page which is a real page within a real LU constituted by real pages of the specified real page length, and the value of whose state information is "unused" (step S1002).

On the other hand, if the result of the decision in the step S802 is affirmative (YES in the step S802), the pool management program 132 takes the write data element before compression as the write subject (step S811). The reason for this is that the fact that the result of the decision in the step S802 is affirmative means that there is substantially no merit in compression, since, even if the write data element is compressed, it does not become shorter. Next, the pool management program 132 performs the default length real page selection processing shown in FIG. 9 (abbreviated in the figure as "DLRP selection processing") (step S812). In other words, the pool management program 132 refers to the pool table 135 and to the real page table 136, and selects a real page, among those whose real page length is the same as the virtual page length, the value of whose state information is "unused" (step S901).

After the step S804 or the step S812, a step S805 and subsequent steps are performed.

In other words, the pool management program 132 decides whether or not, in the step S804 or the step S812, the selection of the real page has succeeded (step S805). If the result of the decision in the step S805 is negative (NO in the step S805), the pool management program 132 responds with an error to the host 101 (step S813).

If the result of the decision in the step S805 is affirmative (YES in the step S805), the processing of a step S806 and subsequent steps is performed.

In other words, the pool management program 132 refers to the real page table 136, and changes the value of the state information which corresponds to the real page selected in the step S804 or in the step S812 to "used" (step S806). Next, the pool management program 132 refers to the virtual page table 137, and updates the information relating to the virtual page which is the processing subject (step S807). In concrete terms, the pool management program 132 updates the value of the real page ID corresponding to the virtual page which is the processing subject to the real page ID of the real page which was selected in the step S804 or the step S812, and moreover updates the value of the compressed data length information corresponding to the virtual page which is the processing subject to a value which represents the data length of the compressed write data element. It should be understood that, if the result of the decision in the step S802 is affirmative, the pool management program 132 updates the value of the compressed data length information to a value which is same as a value of the length of the virtual page. Next, the I/O processing program 133 refers to the virtual page table 137, and writes the data element which is the write subject into the real page allocated to the virtual page which is the processing subject (in other words, into the real page which was selected in the step S804 or in the step S812) (step S808). At this time, if the write subject data element is shorter than the real page which is the write destination, meaningless data (for example zero) is written into the region(s) upon the write destination real page other than the region in which the write subject data element is present. Next, the pool management program 132 decides whether or not this time of writing is the first time (step S809), and if the result of this decision is negative (NO in the step S809), in other words, if the step S703 of FIG. 7 is not performed, it changes the value of the state information corresponding to the real page (TRP) which was selected in the step S701 (i.e. the value in the real page table 323) to "unused" (step S810).

Figure 11:
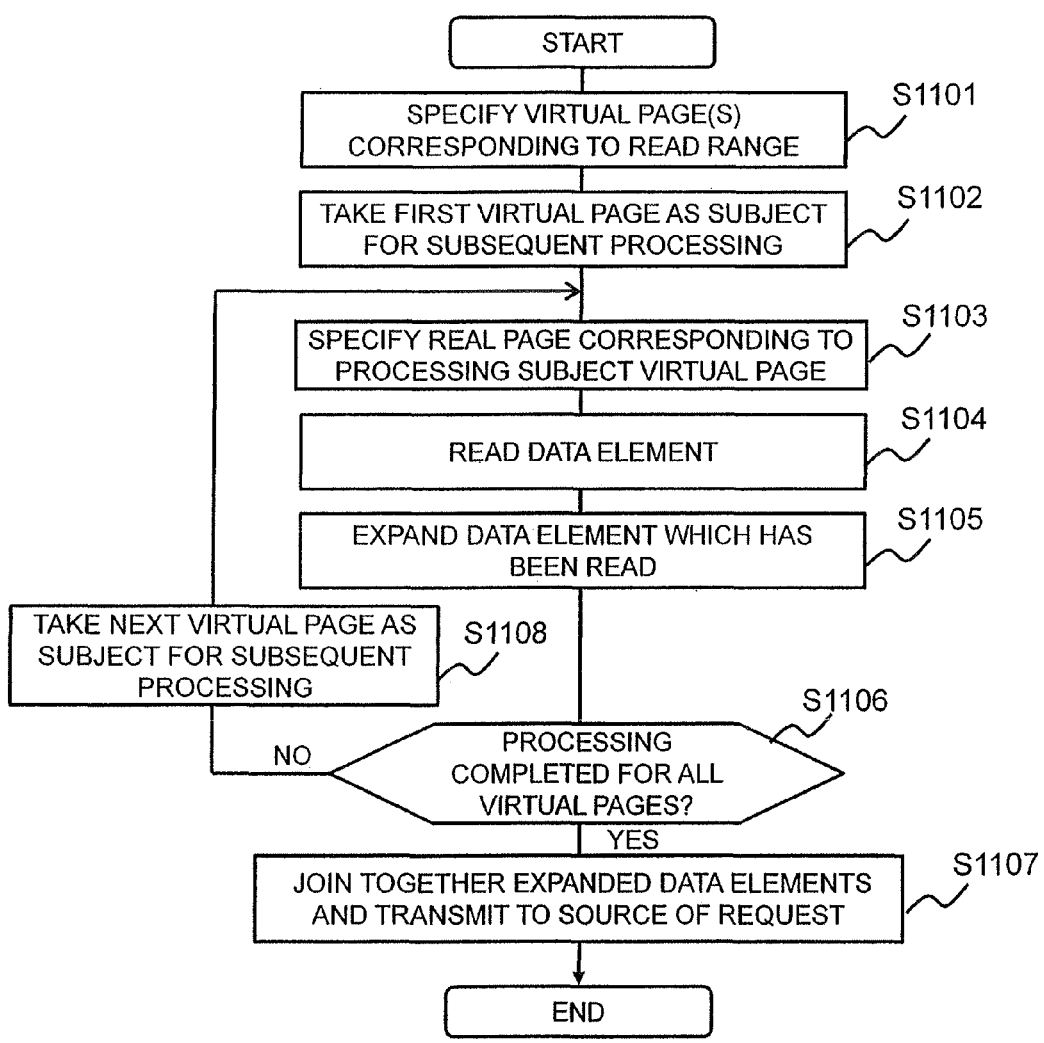
FIG. 11 is a flow chart of read processing in this first embodiment of the present invention.

FIG. 11 is a flow chart for read processing.

This read processing is processing which is executed if the LU which is designated by a read request received from a host 101 is a virtual LU, and if the value of the compression information which corresponds to this virtual LU is "on". In concrete terms, upon receipt of a read request, the pool management program 132 decides whether or not the LU identified from the LUN designated in this read request which has been received is a virtual LU, and whether or not the value of the compression information which corresponds to this virtual LU (i.e. the value which is recorded in the virtual LU table 138) is "on". If the result of this decision is affirmative, the read processing shown in FIG. 11 is started.

The pool management program 132 specifies the one or more virtual pages which correspond to the read range (for example to the LBA and the length of the read subject data) designated by the read request (step S1101).

Next, among the one or more virtual pages which have been specified in the step S1101, the pool management program 132 takes (step S1102) the first virtual page as the subject for the following processing (in other words, the processing of the steps S1103 through S1107).

Next, the pool management program 132 specifies the real page (TRP) corresponding to the virtual page which is the processing subject (step S1103).

Next, the I/O processing program 133 reads the data element stored in the real page specified in the step S1103 (step S1104).

And next, the pool management program 132 inputs this data element which has been read to the compression and expansion circuit 126, and the compression and expansion circuit 126 performs expansion upon this data element which was compressed (in other words, upon the data element which has been read in) (step S1105). However, if the compressed data length (which the value written in the virtual page table 137 represents) of the virtual page which is the processing subject is same as the length of the virtual page, this expansion processing is not executed (in other words, the step S1105 is skipped) because the data element read in the step S1104 in uncompressed data element.

Next, the pool management program 132 decides whether or not processing of all of the virtual pages which correspond to the read range specified in the step S1101 has been completed (step S1106). If the result of this decision in the step S1106 is negative (NO in the step S1106), the pool management program 132 takes as the subject for the subsequent processing (in other words, takes to be processed by the steps S1103 through S1105) the next virtual page, among those virtual pages which have not yet been processed (step S1108), and performs the step S1103 for this virtual page which is the processing subject. On the other hand, if the result of the decision in the step S1106 is affirmative (YES in the step S1106), the pool management program 132 performs a step S1107. In other words, the pool management program 132 joins together all of the expanded data elements which are present within the cache memory 125 (in other word, creates read data according to the read request which was received from the host 101), and transmits the read data which is thus generated to the host 101.

The above completes the explanation of the first embodiment.

According to this first embodiment, real pages of a plurality of different real page lengths are mixed together in the pool 2601, and the management is performed in real page units. The number of real pages which must be managed is smaller, as compared to the case when the lengths of all of the real pages are short (for example, when all of the real page lengths are less than the virtual page length). Due to this, it is possible to suppress decrease of the capacity scalability.

Moreover, according to this first embodiment, the shortest real page length is specified, among the real page lengths which are greater than or equal to the length of the compressed write data element, and the compressed write data element is stored in a real page of the specified real page length. Due to this, it is possible to implement high capacity efficiency.

Mode for the Invention 2

In the following, a second embodiment of the present invention will be explained. During this explanation, emphasis will be placed upon the points of difference from the first embodiment, and explanation of features in common with the first embodiment will be omitted or abbreviated (and this will also be done in the cases of the third and the fourth embodiment described hereinafter).

In this second embodiment, no real page length is defined for an unused pool sub-region 2603, and consequently no real pages are present within those unused pool sub-regions 2603. In the write processing, if the controller 120 has not been able to specify a suitable real page from any pool sub-region 2603 which is in use as a storage destination for the compressed write data element, it defines a real page length for an unused pool sub-region 2603. By doing this, real pages of this real page length are defined in this unused pool sub-region 2603. The controller 120 selects one real page from this unused pool sub-region 2603, and allocates this real page to the write destination virtual page. Moreover, in this second embodiment, each of the real LUs which make up the pool 2601 is made up from a plurality of chunks (sub-storage regions of the real LUs), and a real page length is defined for each chunk. For this reason, in this second embodiment, the chunks are pool sub-regions 2603. In this second embodiment, a chunk is of fixed length, and all of the chunks are the same length.

In the following, this second embodiment of the present invention will be explained in detail.

Figure 12:
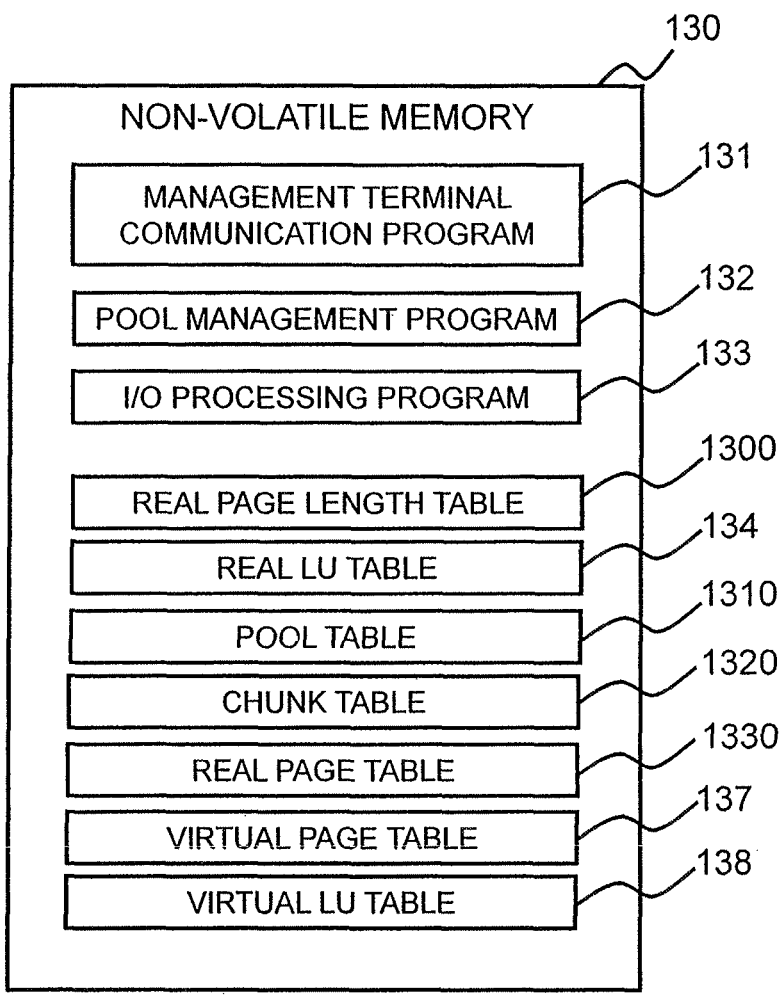
FIG. 12 shows a program and table held in a non-volatile memory 130 of a second embodiment of the present invention.

FIG. 12 shows programs and tables held in the non-volatile memory 130 in this second embodiment of the present invention.

In this second embodiment, a real page length table 1300 and a chunk table 1320 are added. Moreover, the contents of the pool table 1310 and of the real page table 1330 are different from the contents of the pool table 135 and the real page table 136, respectively.

Figure 13:
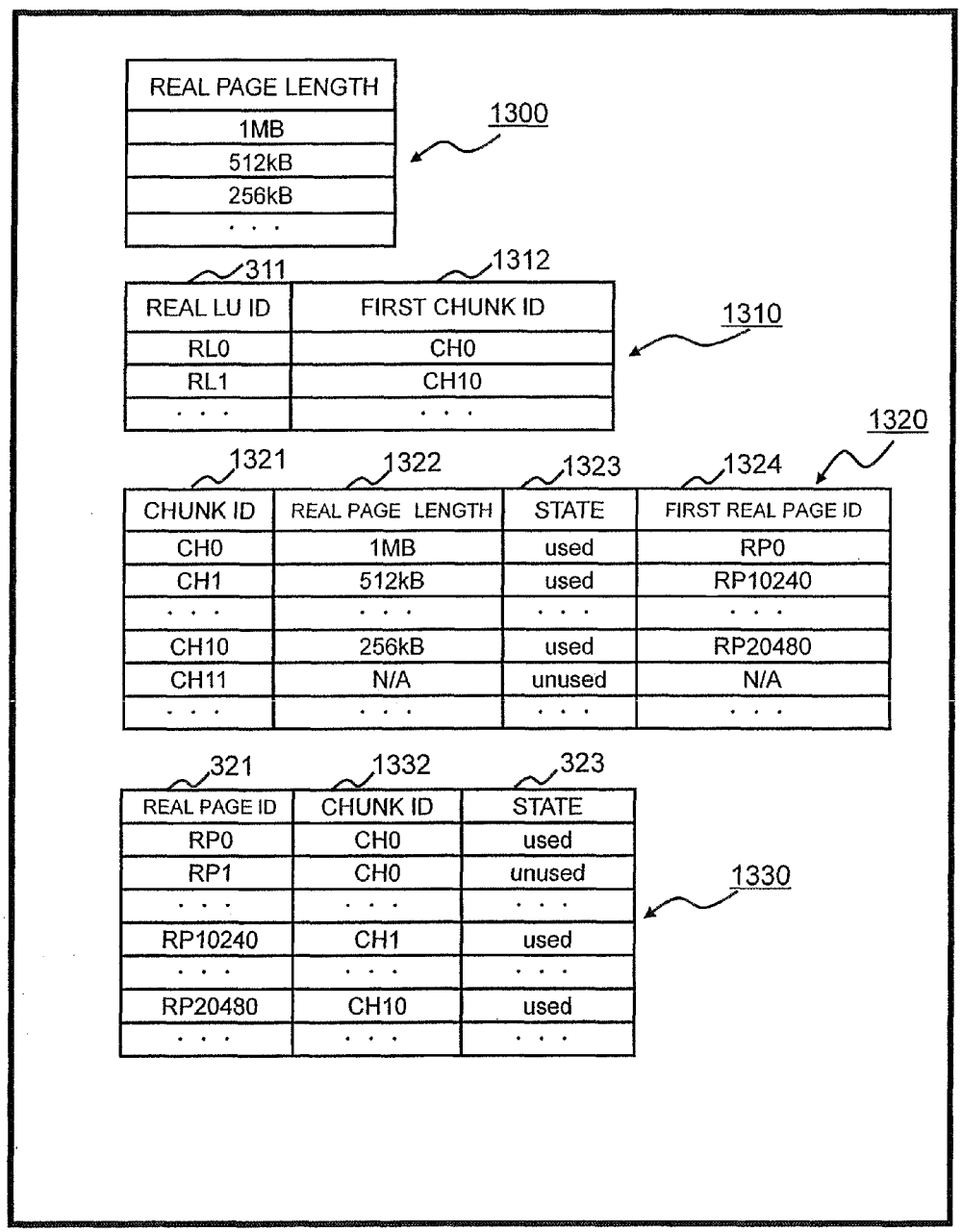
FIG. 13 is a structural diagram of tables 1300, 1310, 1320, and 1330 in this second embodiment of the present invention.

FIG. 13 is a structural diagram of the previously described tables 1300, 1310, 1320, and 1330 in this second embodiment.

The real page length table 1300 is a list in which real page lengths can be defined. According to this table 1300, the maximum real page length is 1?MB (megabyte), and this is the same as the virtual page length.

Instead of the fields 312 and 313 shown in FIG. 3, the pool table 1310 contains a field 1312 for each of the real LUs which make up the pool. The first chunk IDs are recorded in these fields 1312. The first chunk ID is information which represents the identifier of the chunk which is at the first of this real LU. According to this table 1310, it will be understood that the real LU which has the real LU ID "RL0" consists of the ten chunks "CH0" through "CH9". Due to this, the first chunk ID which corresponds to this real LU is "CH0".

The chunk table 1320 is a table for managing information related to the chunks. In concrete terms, this chunk table 1320 may have, for example, for each chunk, a field 1321 in which the chunk ID is recorded, a field 1322 in which the real page length is recorded, a field 1323 in which state information is recorded, and a field 1324 in which the first real page ID is recorded. To take one chunk as an example (hereinafter, in this paragraph, this will be termed the "subject chunk"), the various types of information which are recorded in this table 1320 are as described below. The chunk ID is information which represents the identifier of the subject chunk. The state information is information which represents the state of use of the subject chunk. For example, if a real page length is defined for the subject chunk, the value of its state information is "used", while if no real page length is defined for the subject chunk, the value of its state information is "unused". And the first real page ID is information which represents the identifier of the real page which is the first of the subject chunk.

The real page table 1330 has a field 1332 for each of the real pages, instead of the field 332 shown in FIG. 3. A chunk ID is recorded in this field 1332. This chunk ID is information which represents the identifier of the chunk which has the real page corresponding to this field 1332.

Figure 14:
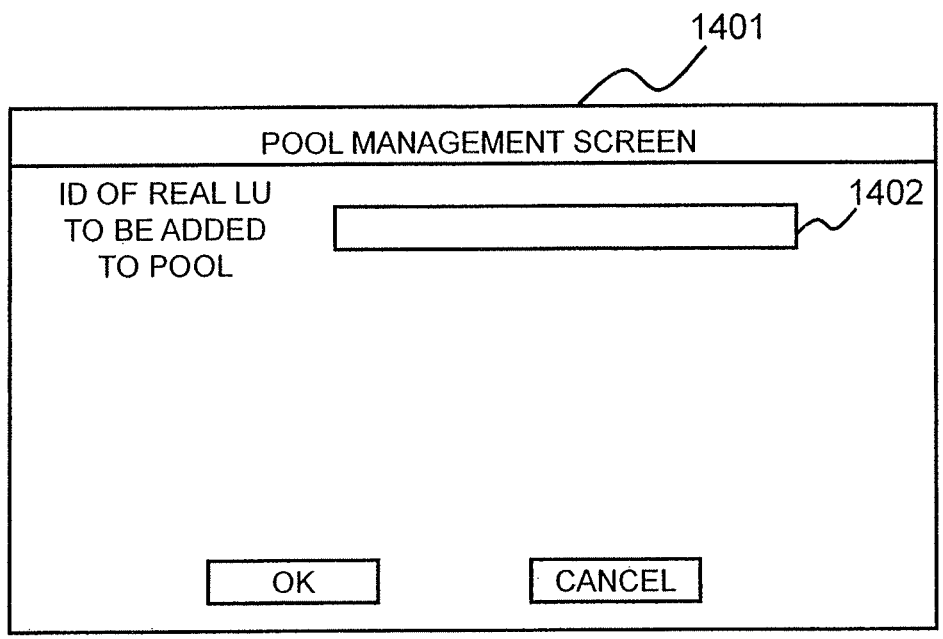
FIG. 14 shows an example of a pool management screen 1401 in the second embodiment of the present invention.

FIG. 14 shows an example of a pool management screen 1401 in this second embodiment.

A real page length input field is provided upon this pool management screen 1401, and in this feature it differs from the pool management screen 401 shown in FIG. 4.

When an "OK" button is pressed by the user, as already explained, a record is added to the pool table 1310 in which a real LU ID which has been inputted from the user is recorded. The first chunk ID which is recorded in this record is made to be the next ID after the ID of the last chunk in the pool 2601. Furthermore, based on the capacity corresponding to the real LU which has been added to the pool 2601, the pool management program 132 specifies the number of chunks which make up this real LU which has been added, and adds the same number of records to the chunk table 1320 as this number of chunks which has been specified. While a chunk ID is recorded in each of the records which has thus been added, the values of the real page length, the state information, and the first real page ID are "N/A".

Figure 15:
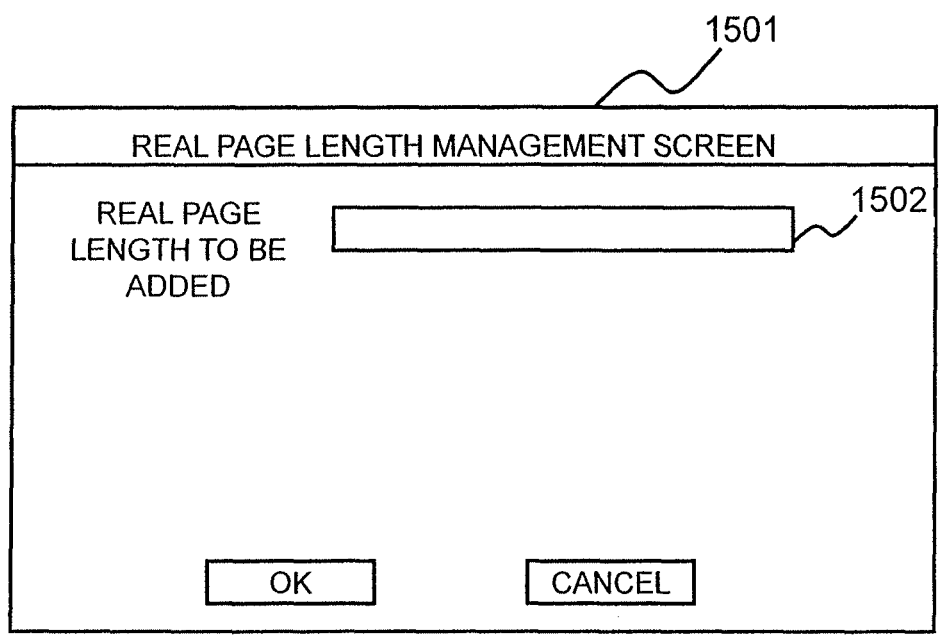
FIG. 15 shows an example of a real page length management screen 1501.

FIG. 15 shows an example of a real page length management screen 1501.

A GUI is displayed by the UI control program 148 upon this real page length management screen 1501. An input field 1502 for inputting a real page length to be added is provided upon this real page length management screen 1501. Using the input device 142, the user inputs a real page length to be added in this added real page length input field 1502.

When an "OK" button is pressed by the user, the storage communication program 149 notifies the real page length which has been inputted in the input field 1502 to the storage system 110. The management terminal communication program 131 within the storage system 110 receives this information, and the pool management program 132 performs the following processing. In other words, the pool management program 132 adds a record to the real page length table 1300, in which the real page length which has been received by the management terminal communication program 131 (i.e. which has been inputted from the user) is recorded.

It would also be acceptable to arrange for real data lengths of a plurality of types to be recorded in advance in the real page length table 1300 upon shipment of the product, and to make editing of the table 1300 impossible.

Figure 16:
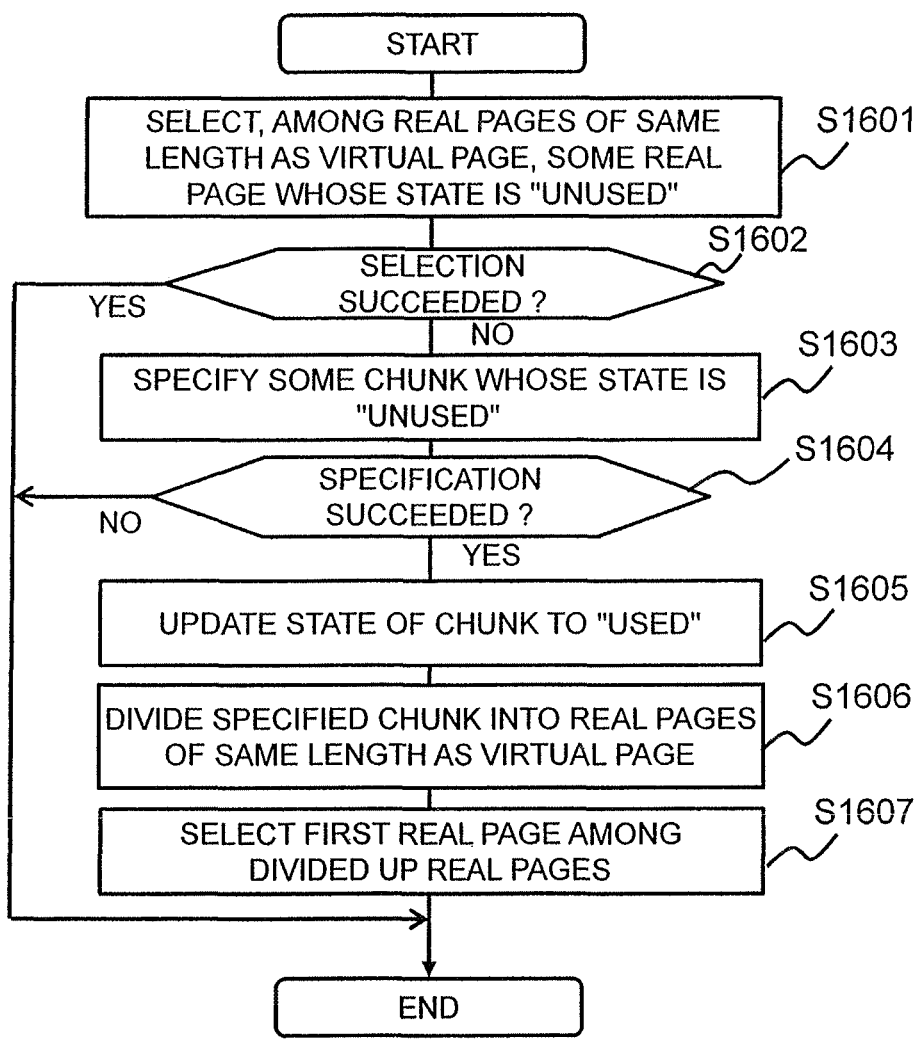
FIG. 16 is a flow chart of default length real page selection processing in the second embodiment of the present invention.

FIG. 16 is a flow chart of the default length real page selection processing in the second embodiment of the present invention This default length real page selection processing is the processing which is performed in the step S812 of FIG. 8.

The pool management program 132 refers to the field 1322 of the chunk table 1320, and selects, among those real pages whose length is the same as the virtual page length, a real page for which the value of the state information is "unused".

The pool management program 132 then takes a decision as to whether or not the selection of a real page in the step S1601 has been successful (step S1602). If the result of the decision in this step S1602 is affirmative (YES in the step S1602), this sequence of selection processing terminates.

On the other hand, if the result of the decision in the step S1602 is negative (NO in the step S1602), since, for example, for no chunk which is in use, is there any unused real page whose length is the same as the virtual page length, accordingly, for some unused chunk, a real page length is defined which is the same as the virtual page length.

In concrete terms, the pool management program 132 refers to the chunk table 1320, and specifies some chunk whose state is "unused" (step S1603).

Next, the pool management program 132 takes a decision as to whether or not the specification of a chunk in the step S1603 has succeeded (step S1604). If the result of this decision in the step S1604 is negative (NO in the step S1604), this sequence of selection processing terminates. On the other hand, if the result of this decision in the step S1604 is affirmative (YES in the step S1604), the pool management program 132 updates the value of the state information in the chunk table 1320 corresponding to the chunk which was specified in the step S1603 to "used" (step S1605). In this step, for example, the value of the first real page ID corresponding to the chunk which was specified in the step S1603 is updated by the pool management program 132 from "N/A" to an effective value.

Next, the pool management program 132 divides the chunk which was specified in the step S1603 into real pages of the same length as the virtual pages (step S1606). In concrete terms, the pool management program 132 may, for example, update the value in the chunk table 1320 of the real page length corresponding to the chunk which was specified in the step S1603 to a value which represents the virtual page length (i.e. to a real page length which is the same as the virtual page length as described in the real page length table 1300). Moreover, the pool management program 132 may, for example, calculate the number of real pages which make up the chunk specified in the step S1603 by dividing the capacity of the chunk (for example 1?GB (gigabyte) by the virtual page length, and may add the same number of records as this number. In each record which is thus added, the real page ID is a value which is automatically allocated (for example a number in sequence), the chunk ID is an identifier of the specified chunk, and the state is "unused".

Next, among those real pages into which the chunk specified in the step S1603 was divided up, the pool management program 132 selects the first real page (step S1607).

Figure 17:
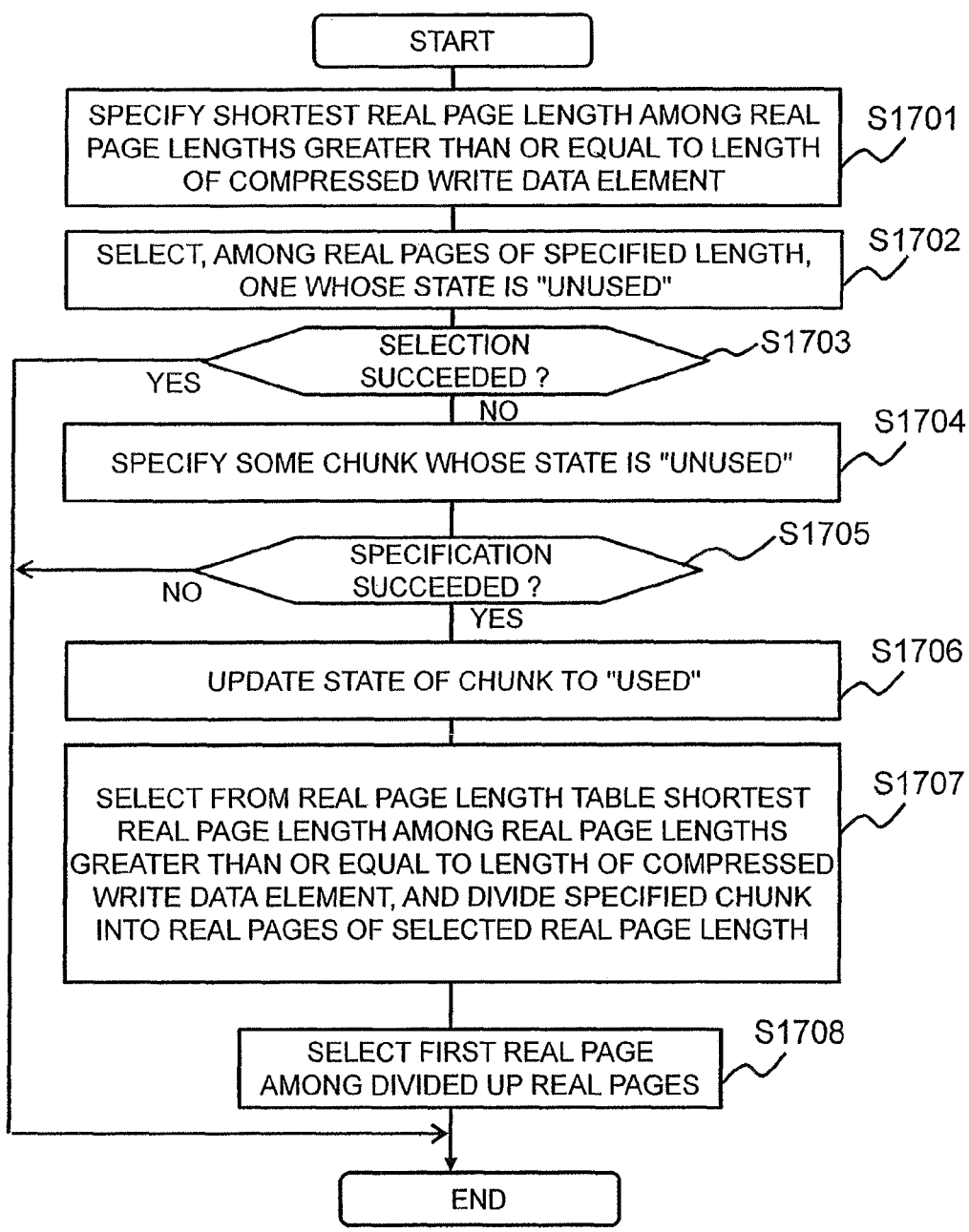
FIG. 17 is a flow chart of real page selection processing in the second embodiment of the present invention.

FIG. 17 is a flow chart of the real page selection processing in this second embodiment.

This real page selection processing is the processing which is performed in the step S804 of FIG. 8.

The pool management program 132 refers to the field 1322 of the chunk table 1320, and specifies the shortest real page length, among the real page lengths which are greater than or equal to the length of the compressed write data element (step S1701). Next, the pool management program 132 refers to the real page table 136, and selects a real page which is a real page within a chunk constituted by real pages of the specified real page length, and the value of whose state information is "unused" (step S1702).

The pool management program 132 then takes a decision as to whether or not the selection of a real page in the step S1702 has been successful (step S1703). If the result of the decision in this step S1703 is affirmative (YES in the step S1703), this sequence of selection processing terminates.

On the other hand, if the result of the decision in the step S1703 is negative (NO in the step S1703), since, for example, for no chunk which is in use, is there any unused real page whose length is that specified in the step S1701, accordingly the shortest real page length among the real page lengths which are greater than or equal to the length of the compressed write data element is selected from the real page length table 1300, and the selected real page length is defined for some unused chunk.

In concrete terms, after the step S1702, the steps S1703 through S1708 are performed. The processing, in the steps S1703 through S1708, of the steps other than the step S1707 is the same, respectively, as the processing, in the steps S1602 through S1607, of the steps other than the step S1606, explained above with reference to FIG. 16.

In the step S1707, the pool management program 132 selects, from the real page length table 1300, the shortest real page length among those real page lengths which are greater than or equal to length of the compressed write data element, and divides up the specified chunk into real pages of this selected real page length. In concrete terms, for example, the pool management program 132 may update the value of the real page length in the chunk table 1320 which corresponds to the chunk specified in the step S1704 to a value which represents the real page length specified as described above. Furthermore, by for example dividing the capacity of the chunk by the real page length which has been selected as described above, the pool management program 132 calculates the number of real pages which make up the chunk specified in the step S1704, and adds the same number of records as this number to the real page table 1330. In each of these records which is added, the real page ID is a value which is automatically added, the chunk ID is the identifier of the chunk which was specified in the step S1704, and the state is "unused".

Figure 18:
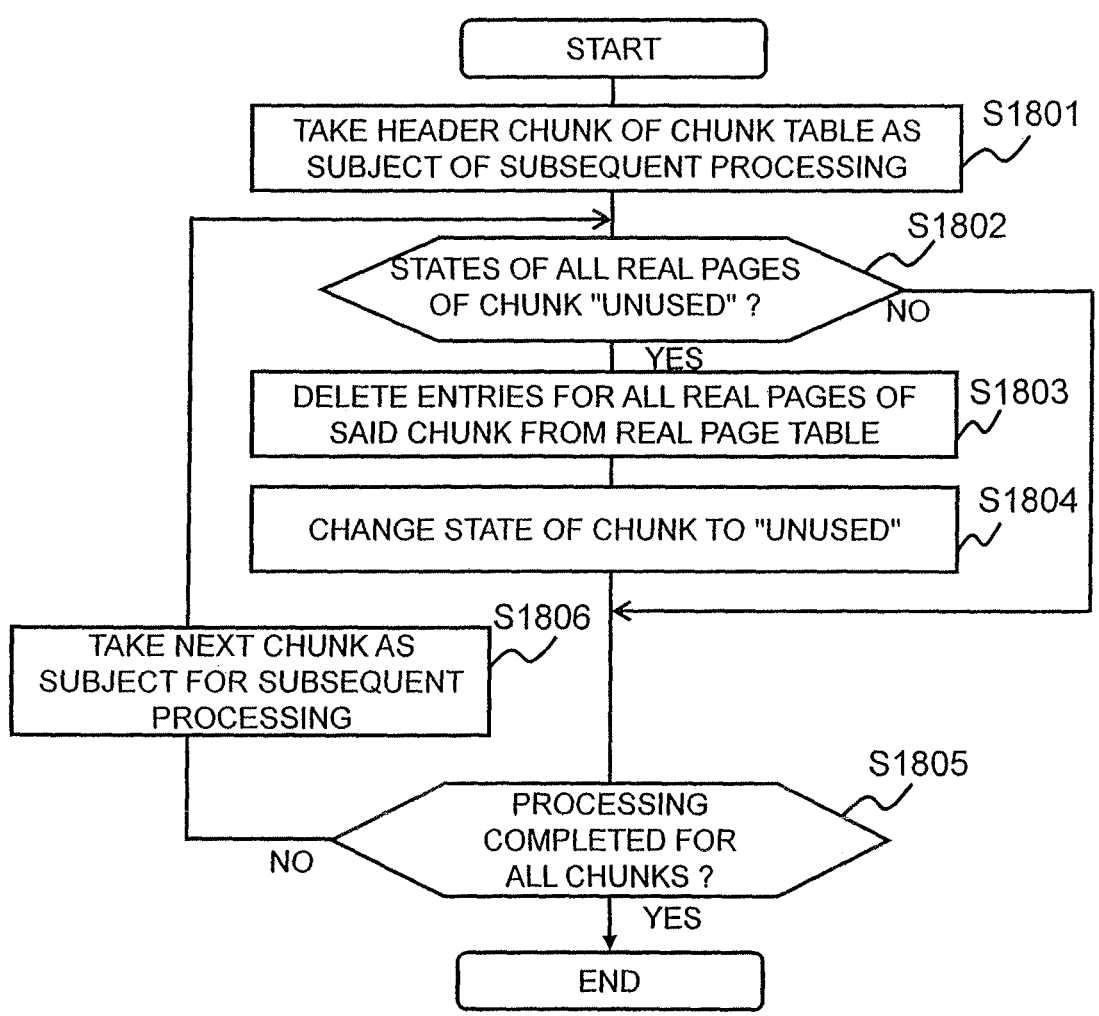
FIG. 18 is a flow chart of chunk garbage collection processing.

FIG. 18 is a flow chart for chunk garbage collection processing.

This chunk garbage collection processing is processing for increasing the number of unused chunks. In concrete terms, it is processing in which, if the states of all of the real pages which make up some chunk whose state is "used" are "unused", the state of this chunk is updated from "used" to "unused". This chunk garbage collection processing may be started, for example, upon any one of the occasions (16-1) through (16-4) described below.

(16-1) the CPU 123 is at low load (for example, the load upon the CPU 123 is lower than some predetermined load);

(16-2) periodically;

(16-3) a command has been received from the user of the management terminal 102;

(16-4) the proportion of used chunks has dropped below some predetermined threshold value (for example, upon reference to the chunk table 1320, the pool management program 132 has detected that the number of "used" values of the state information has become less than some predetermined number).

The pool management program 132 refers to the chunk table 1320, and takes its first chunk ID as being the subject of the following processing (step S1801).

Next, the pool management program 132 refers to the real page table 1330, and decides whether or not the states of all the real pages of the chunk which is the processing subject are "unused" (step S1802). If the result of this decision in the step S1802 is negative (NO in the step S1802), the flow of control proceeds to a step S1805.

On the other hand, if the result of the decision in the step S1802 is affirmative (YES in the step S1802), the pool management program 132 deletes from the real page table 1330 the entries for all of the real pages which correspond to the chunk which is the processing subject (i.e. entries for which the state information is "unused") (step S1803).

Next, the pool management program 132 refers to the chunk table 1320, and changes the state information of the chunk which is the processing subject to "unused" (step S1804).

Next, the pool management program 132 decides whether or not processing has been completed for all of the chunks (step S1805). If the result of this decision in the step S1805 is affirmative (YES in the step S1805), this processing sequence terminates. On the other hand, if the result of this decision in the step S1805 is negative (NO in the step S1805), the pool management program 132 takes (step S1806) the next chunk, among all of the chunks, as the subject for the subsequent processing (in other words, for the processing of the steps S1802 through S1805), and then performs the step S1802 for this chunk which is the processing subject.

The above completes the explanation of this second embodiment of the present invention. According to this second embodiment, the lengths of the real pages in the pool sub-regions 2603 are defined dynamically and change dynamically. Due to this, it is possible to anticipate that the real page lengths will be defined more appropriately, as compared to the case in which the lengths of the real pages in all of the pool sub-regions 2603 are defined and set in advance.

Moreover, in this second embodiment, the pool sub-regions 2603 are chunks whose capacities are smaller than those of the real LUs. Due to this, even if, for example, after a real page length has been temporarily defined for some chunk, not many compressed data elements are stored in that some chunk, still it is possible to manage with a smaller amount of empty regions, as compared to the case when the real LUs are the pool sub-regions.

It should be understood that, with this second embodiment, the variant embodiments described below may be contemplated.

In a first variant embodiment, the controller 120 is endowed with a function of automatically learning the real data lengths. In concrete terms, for example, in the step S1707, the pool management program 132, along with defining the real page length which was specified in the step S1701 in an unused chunk, also adds this real page length to the real page length table 1301. The real page length specified at the step S1701, for example, may be the length which are greater than or equal to the length of the compressed write data element and the shortest multiples among a plurality of the multiples of the predetermined length (e.g. 64 kB).

Figure 29A:
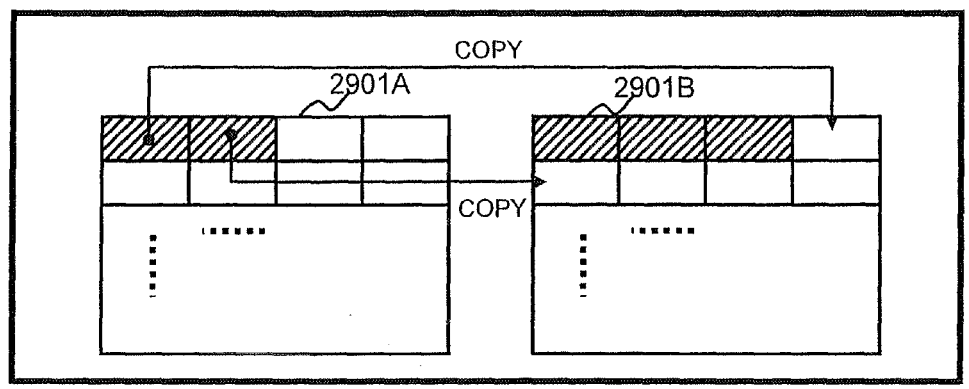
FIG. 29A shows copying of data units between pool sub-regions, as performed in a second variant embodiment of the second embodiment of the present invention.
Figure 29B:
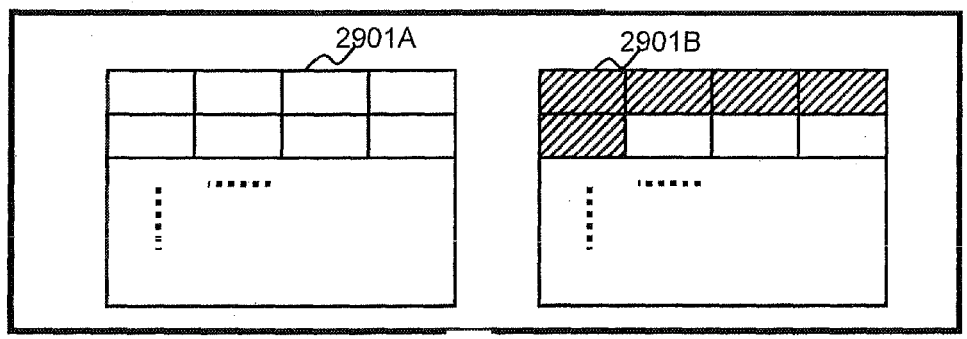
FIG. 29B shows that the states of the real pages which were the sources of copying have been updated from "used" to "unused", in this second variant embodiment of the second embodiment of the present invention.
Figure 29C:
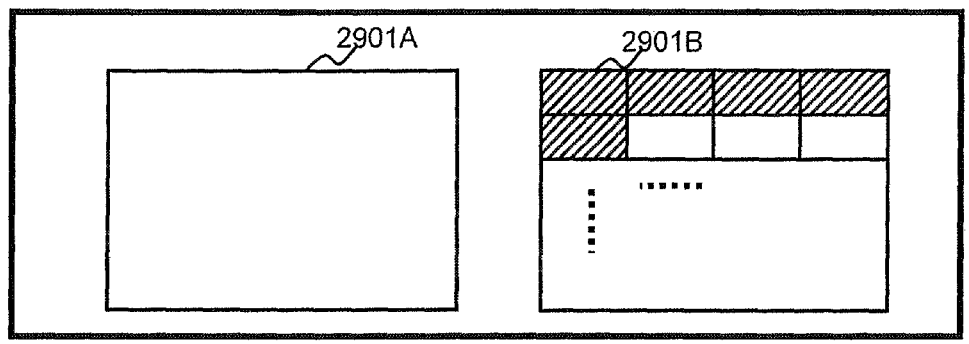
FIG. 29C shows that the state of the pool sub-region which was the source of copying has been updated from "used" to "unused".

In a second variant embodiment, the controller 120 is endowed with a function of copying data units from all of the real pages which are in use within some pool sub-region to unused real pages within one or more other pool sub-regions, and updating the states of all of the real pages which are the sources of this copying from "used" to "unused". For example, as shown in FIG. 29A, the pool management program 132 specifies two or more pool sub-regions (for example, the two chunks 2901A and 2901B) whose defined real page lengths are the same. Moreover, among the two or more pool sub-regions which have been specified, the pool management program 132 specifies that pool sub-region in which the number of real pages which are in use is the least. And the I/O processing program 133 copies the data units from all of the real pages which are in use (i.e. from those real pages which are shown by hatching in FIG. 29A) within this specified pool sub-region (for example, the chunk 2901A) to unused real pages within the one or more other pool sub-regions described above (for example, the chunk 2901B). And, as shown in FIG. 29B, the pool management program 132 updates the state of all the real pages which have been sources for copying from "used" to "unused". When, by doing this, the chunk garbage collection processing shown in FIG. 18 has been performed, then, as shown in FIG. 29C, the state of the pool sub-region (i.e. the chunk 2901A) which contains the real pages which were the sources for copying is updated from "used" to "unused". Accordingly, with this second variant embodiment, it is possible to increase the number of unused pool sub-regions. It should be understood that, by taking the source for copying as being that pool sub-region in which the number of real pages which are in use is the least, it is possible to suppress the number of times copying is performed to the minimum limit. It would be acceptable to include the updating of the states of the real pages which have been the source of copying or being copied to in this chunk garbage collection processing; or it would also be acceptable to this to constitute separate processing from that processing. Moreover, for example, any one of the occasions (16-1) through (16-4) described above will be acceptable for starting the processing for determining the pool sub-region which is to be the source for copying.

Mode for the Invention 3

In a third embodiment, sometimes a plurality of real pages are allocated to one virtual page. Due to this, for example, in the steps S701 and S706 of the real page read processing (FIG. 7) or in the step S810 of the real page write processing (FIG. 8), the number of TRPs (real pages which are allocated to the virtual page which is the processing subject) sometimes is one, and sometimes is two or more. In a similar manner, the number of real pages which is specified in the step S1103 of the read processing (FIG. 11) sometimes is one, and sometimes is two or more.

FIG. 19 is a structural diagram of a virtual page table 1900 in this third embodiment of the present invention.

This table 1900 has a field 1902, instead of the field 332. Sometimes a plurality of real page IDs are recorded in this field 1902, rather than only one real page ID. This is because, as previously described, sometimes a plurality of real pages are allocated to one virtual page.

Figure 20:
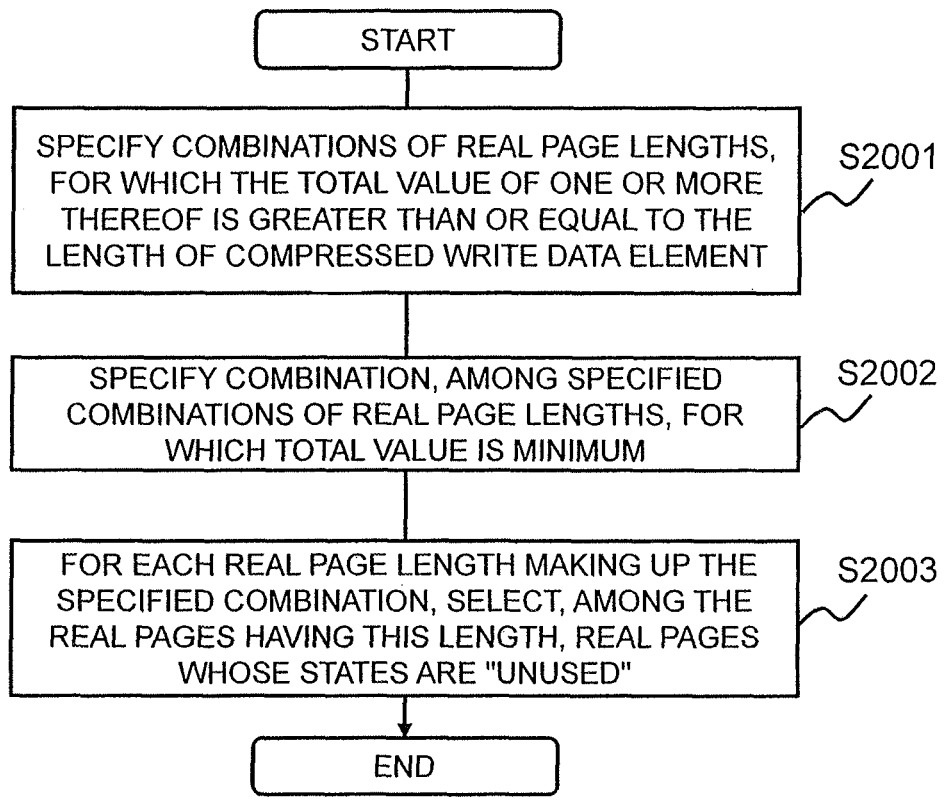
FIG. 20 is a flow chart of real page selection processing in this third embodiment of the present invention.

FIG. 20 is a flow chart of the real page selection processing in this third embodiment of the present invention.

The pool management program 132 refers to the field 312 of the pool table 135 shown in FIG. 3, and specifies, among the real page lengths which are greater than or equal to the length of the compressed write data element, one or more combinations of real page lengths, for which the total value of one or more of the real page lengths is longer than the length of the compressed write data element (step S2001).

Next, the pool management program 132 refers to the real page table 136, and specifies, among the combinations of real page lengths which have been specified, that combination for which the total value is minimum (step S2002).

Next, the pool management program 132 refers to the real page table 136, and selects, for each real page length which makes up the combination which was specified in the step S2002, among the real pages having this length, real pages for which the value of the state information is "unused" (step S2003).

The above completes the explanation of the third embodiment of the present invention. According to this third embodiment, it is possible to anticipate enhancement of the capacity efficiency by yet a further level.

Mode for the Invention 4

In a fourth embodiment of the present invention, upon receipt of a write request from a host 101, in the write processing which is performed when this write request is received, the controller 120, does not for the time being compress the data element which is written to the virtual page which is the processing subject, but instead stores it in a real page which is of the same length as the virtual page length. Thereafter, asynchronously with the write processing, the controller 120 reads the data element from this real page which is of the same length as the virtual page length, and performs, upon the data element which has been read, the real page write processing which has been explained with reference to FIG. 8, described above.

In the following, this fourth embodiment of the present invention will be explained in detail.

FIG. 21 is a structural diagram of a virtual page table 2137 in this fourth embodiment of the present invention.

In this virtual page table 2137, for each virtual page, in addition to the fields 331 through 333, there is provided a field 334 in which station information is recorded. This state information is information which represents whether or not the data elements which are stored in the real page (hereinafter, in this paragraph, this is termed the subject real page) allocated to the virtual page corresponding to this state information are compressed. For example, if the data elements stored in the subject real page are compressed, the value of this state information is "compressed", whereas, if the data elements stored in the subject real page are not compressed, the value of this state information is "uncompressed". If no real page is allocated to the virtual page, the value of the state information which corresponds to this virtual page may be, for example, "N/A".

Figure 22:
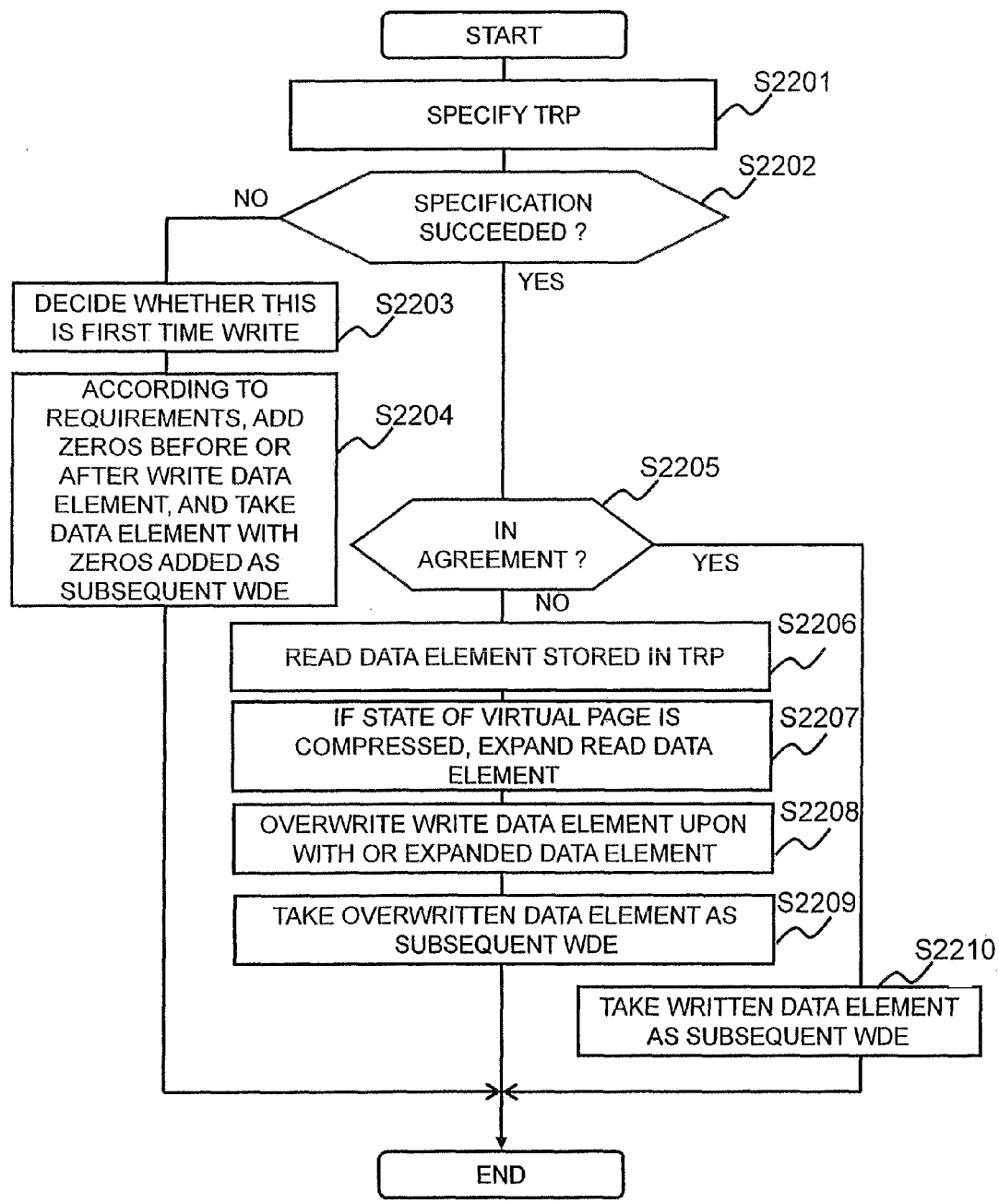
FIG. 22 is a flow chart of real page read processing in the fourth embodiment of the present invention.

FIG. 22 is a flow chart of the real page read processing in the fourth embodiment of the present invention.

The steps S2201 through S2210 of the real page read processing in this fourth embodiment correspond, respectively, to the steps S701 through S710 of the real page read processing in the first embodiment. The step S2207 is different from the step S707, and, along therewith, the step S2208 is different from the step S708. The processing of the steps S2201 through S2210 other than these steps S2207 and S2208 is, respectively, the same as that of the steps S701 through S701 other than the steps S707 and S708.

In the step S2207, the pool management program 132 refers to the virtual page table 2137, and, if the value of the state information corresponding to the virtual page which is the processing subject is "compressed", inputs the data element which was read in the step S2206 to the compression and expansion circuit 126, so that the compression and expansion circuit 126 expands this data element. On the other hand, if the value of this state information is not "compressed", the pool management program 132 does not input the data element which has been read to the compression and expansion circuit 126.

Due to this, in the step S2208, the I/O processing program 133 overwrites the data element which is written upon the virtual page which is the processing subject, with this expanded data element or data element which has been read itself.

Figure 23:
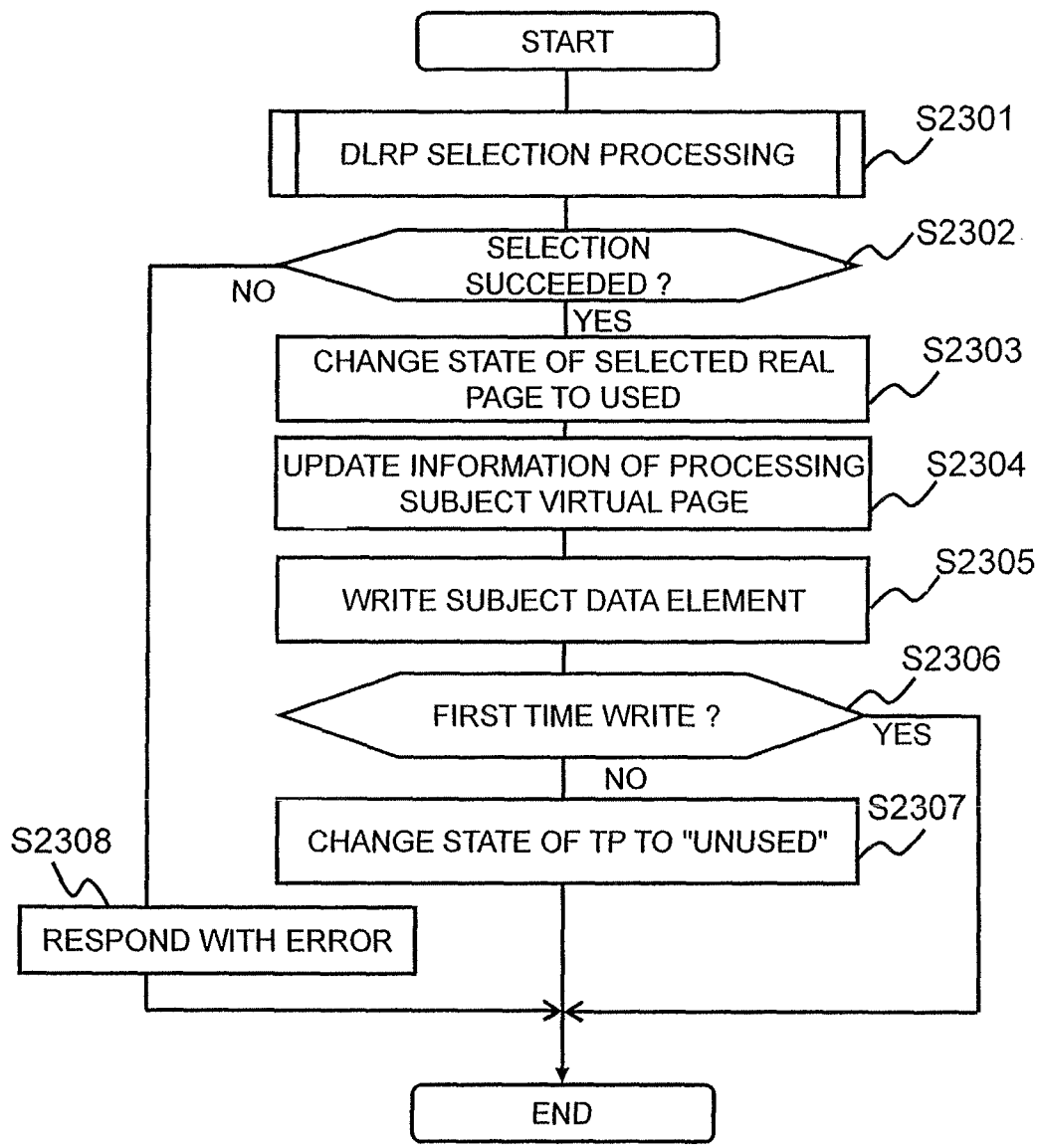
FIG. 23 is a flow chart of provisional real page write processing.

FIG. 23 is a flow chart of provisional real page write processing.

This provisional real page write processing is processing which is performed instead of the real page write processing in the step S604 of the write processing shown in FIG. 6. As has already been explained in detail, and as will be explained in detail hereinafter, this real page write processing is performed asynchronously with the write processing.

The pool management program 132 performs the default length real page selection processing explained with reference to FIG. 9 (abbreviated in the figure as "DLRP selection processing") (step S2301).

Next, the pool management program 132 decides whether or not, in the step S2301, the selection of the real page has succeeded (step S2302). If the result of the decision in the step S2302 is negative (NO in the step S2302), the pool management program 132 responds with an error to the host 101 (step S2308).

On the other hand, if the result of the decision in the step S2302 is affirmative (YES in the step S2302), the processing of a step S2303 and subsequently is performed.

In other words, the pool management program 132 refers to the real page table 136, and changes the value of the state information corresponding to the real page which was selected in the step S2301 to "used" (step S2303). Next, the pool management program 132 refers to the virtual page table 2137, and updates the information relating to the virtual page which is the processing subject (step S2304). In concrete terms, the pool management program 132 updates the value of the real page ID corresponding to the virtual page which is the processing subject to the real page ID of the real page which was selected in the step S2301, updates the value of the compressed data length information corresponding to the virtual page which is the processing subject to a value which represents the data length of the compressed write data element, and moreover updates the state information corresponding to the virtual page which is the processing subject to "uncompressed". Next, the I/O processing program 133 refers to the virtual page table 2137, and writes the data element which is the write subject into the real page allocated to the virtual page which is the processing subject (step S2305). At this time, if the write subject data element is shorter than the real page which is the write destination, meaningless data (for example zero) is written into the region(s) upon the write destination real page other than the region in which the write subject data element is present. Next, the pool management program 132 decides whether or not this time of writing is the first time (step 2306), and if the result of this decision is negative (NO in the step S2306), in other words, if the step S2203 of FIG. 22 is not performed, it changes the value of the state information corresponding to the real page (TRP) which was selected in the step S2201 (i.e. the value in the real page table 323) to "unused" (step S2307).

Figure 24:
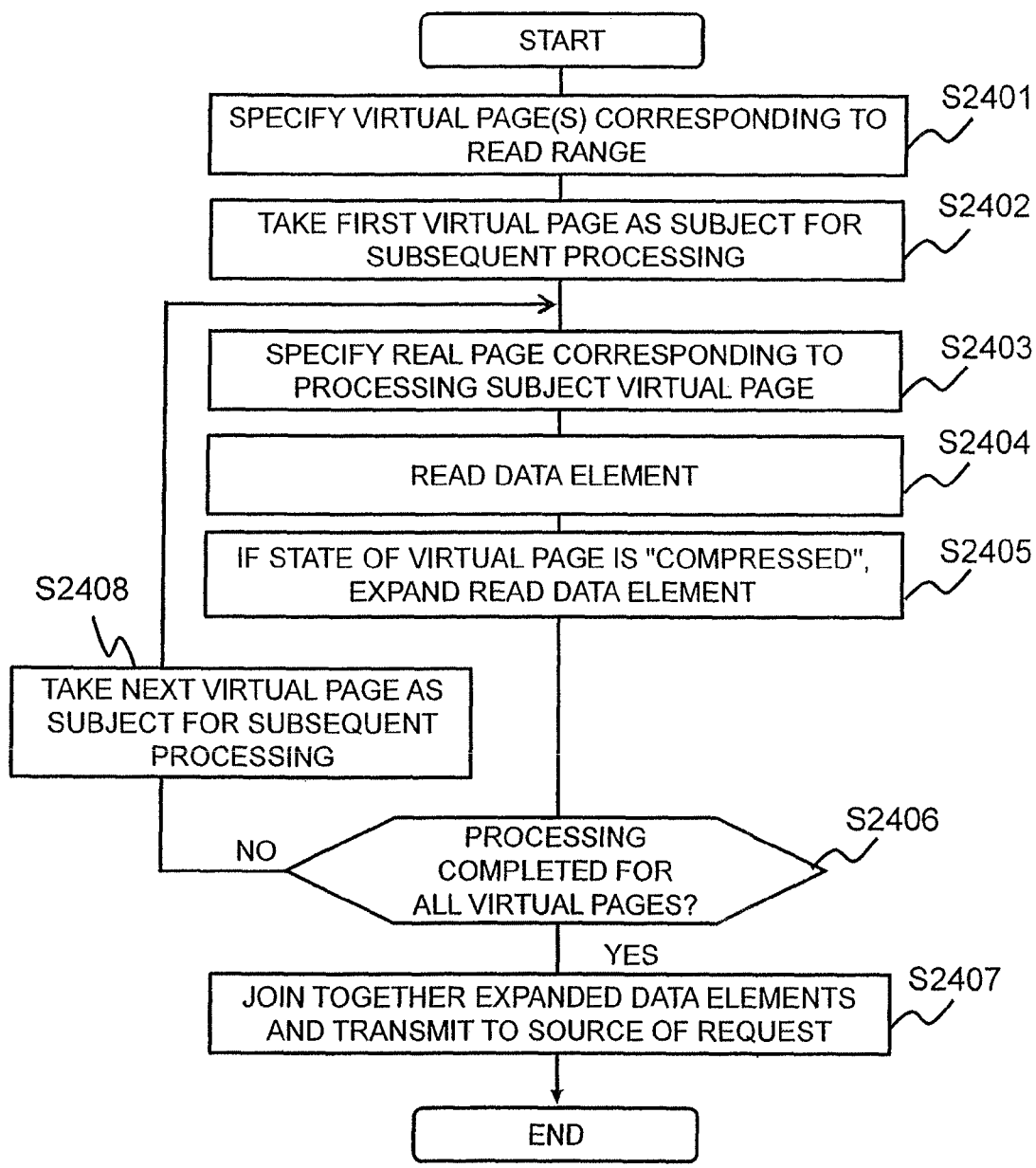
FIG. 24 is a flow chart of read processing in the fourth embodiment of the present invention.

FIG. 24 is a flow chart of the read processing in this fourth embodiment of the present invention.

The steps S2401 through S2408 of the read processing in this fourth embodiment correspond, respectively, to the steps S1101 through S1108 of the real page read processing in the first embodiment. The step S2405 is different from the step S1105, but the processing of the steps S2401 through S2408 other than this step S2405 is, respectively, the same as that of the steps S1101 through S1108 other than the step S1105.

In the step S2405, the pool management program 132 refers to the virtual page table 2137, and, if the value of the state information corresponding to the virtual page which is the processing subject is "compressed", inputs the data element which was read in the step S2404 to the compression and expansion circuit, so that the compression and expansion circuit 126 expands this data element.

Figure 25:
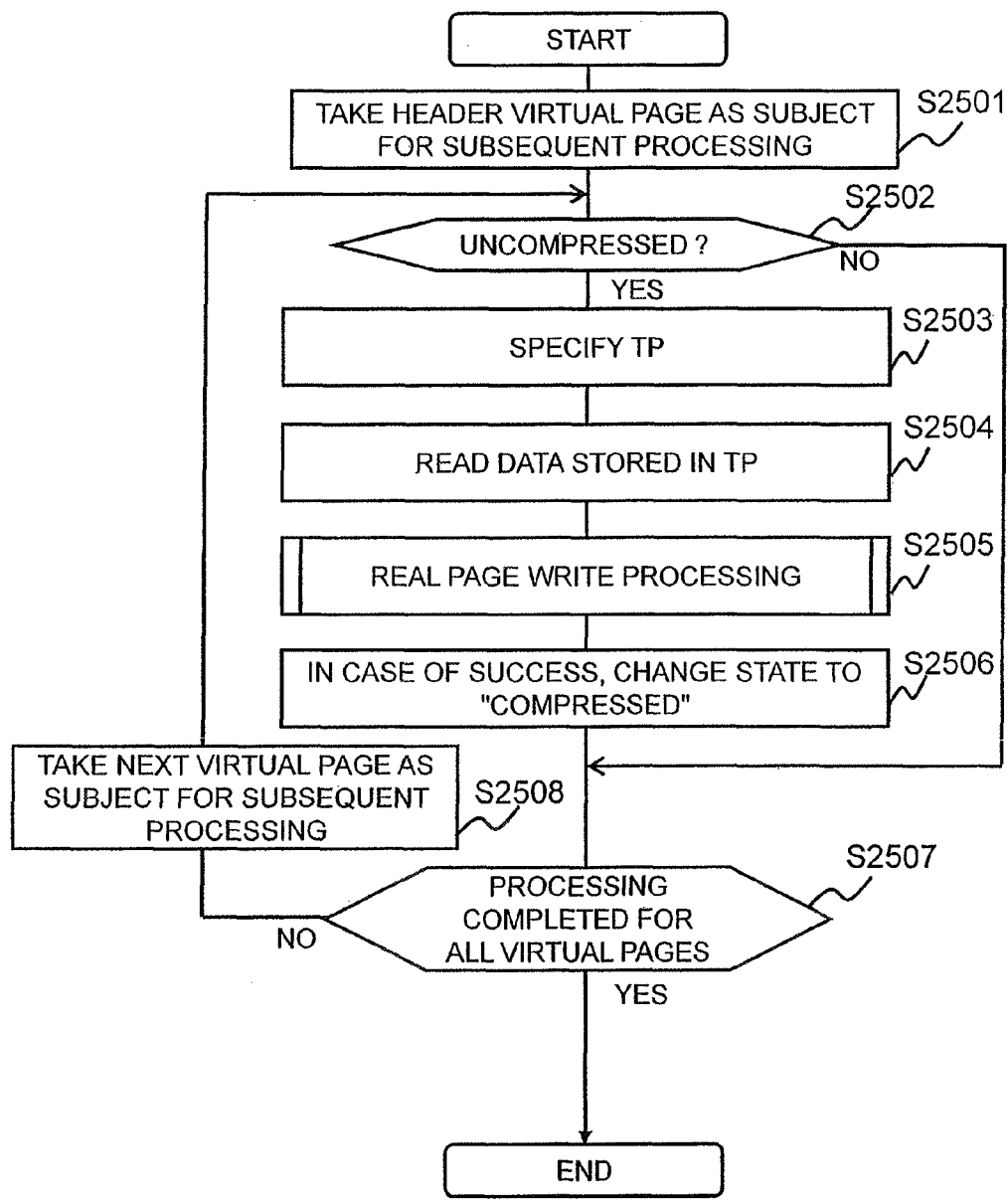
FIG. 25 is a flow chart of asynchronous compression processing.

FIG. 25 is a flow chart of asynchronous compression processing.

This asynchronous compression processing may be started, for example, upon any one of the following occasions (25-1) through (25-4):

(25-1) the CPU 123 is at low load (for example, the load upon the CPU 123 is lower than some predetermined load);

(25-2) periodically;

(25-3) a command has been received from the user of the management terminal 102;

(25-4) the proportion of virtual pages which correspond to "compressed" has dropped below some predetermined threshold value (for example, upon reference to the virtual page table 2137, the pool management program 132 has detected that the number of "compressed" values of the state information has become less than some predetermined number).

The pool management program 132 takes the first virtual page of the virtual LU as the subject for the subsequent processing (of steps S2502 through S2506) (step S2501).

Then the pool management program 132 decides whether or not the value of the state information corresponding to the virtual page which is the subject of processing is "uncompressed" (step S2502).

If the result of the decision in the step S2502 is affirmative (YES in the step S2502), the pool management program 132 specifies the real page corresponding to the virtual page which is the subject of processing (step S2503). And the I/O processing program 133 reads the data element from the real page which has been specified (step S2504). Thereafter, the real page write processing shown in FIG. 8 is performed (step S2505). And, if the real page write processing succeeds, the pool management program 132 changes the value of the state information corresponding to the virtual page which is the subject of processing from "uncompressed" to "compressed" (step S2506).

If the result of the decision in the step S2502 is negative (NO in the step S2502), or after the step S2506, the pool management program 132 decides whether or not processing has been completed for all of the virtual pages of the virtual LU (step S2507). If the result of this decision is negative (NO in the step S2507), the pool management program 132 takes the next virtual page as the subsequent processing subject (step S2508), and executes the step S2502. On the other hand, if the result of this decision in the step S2507 is affirmative (YES in the step S2507), this asynchronous compression processing terminates.

The above completes the explanation of the fourth embodiment of the present invention. Since, according to this fourth embodiment, compression/expansion is not performed during the write processing, accordingly it is possible to reduce the load upon the CPU 123 during the write processing, and moreover it is possible to anticipate enhancement of the processing speed of the write processing.

It should be understood that, for this fourth embodiment, the variant embodiments described below are contemplated. For example, as shown in FIG. 28A, in a virtual page table 2137', for each virtual page, a field 335 may be provided in which the access frequency is recorded (in IOPS, which is an abbreviation of "I/Os per second"). Moreover, as shown in FIG. 28B, an access frequency management program (2801) which is executed by the CPU 123 may be provided in the non-volatile memory 130. This access frequency management program 2801 monitors the access frequency for each of the virtual pages, and updates the access frequencies corresponding to the virtual pages (i.e. the values in the fields 2105 of FIG. 28A) in a timely manner. In this variant embodiment, in the asynchronous compression processing, even if the value of the state information corresponding to the virtual page which is the processing subject is "uncompressed" (YES in the step S2502), still sometimes the steps S2503 and subsequently are not performed, as shown in FIG. 28C. In concrete terms, in the case of YES in the step S2502, the virtual page table 2137' is referred to, the access frequency corresponding to the virtual page which is the subject of processing is specified, and the step S2503 is not performed if the access frequency is higher than some predetermined threshold value (YES in the step S2801). By doing this, in the write processing/read processing for a virtual page whose access frequency is high, it is possible to anticipate enhancement of the processing speed, due to compression/non compression being not performed.

Although, in the above, for example for the second through the fourth embodiments, principally the points of difference from the first embodiment have been explained, it would also be possible to implement a combination of any two or more embodiments, among the first through the fourth embodiments. Moreover, instead of or in addition to the LU which is designated by the write request from the host 101, it would also be acceptable for the virtual LU which is the write destination to be a secondary LU which constitutes a destination for copying of data stored upon a primary LU. One example is shown in FIG. 27. In other words, data elements are copied from a primary LU (a real LU or a virtual LU) which can be accessed from an external device such as a host or the like by units of virtual pages to a secondary LU (a virtual LU) which constitutes a pair with the primary LU. At this time, the data elements which are the subject of copying are compressed, one or more real pages are selected on the basis of the length of the data units included in these compressed data elements, the real pages which have thus been selected are allocated to the virtual page which is the copy destination, and data units which include these compressed data elements are stored in its real pages. If the length of the data units which include these compressed data elements is greater than or equal to the virtual page length, data units which include the data elements before compression are stored in a real page of the same length as the virtual page length.

Although certain preferred embodiments of the present invention have been explained, it goes without saying that the present invention is not to be considered as being limited to these embodiments, and that various changes are possible, provided that the gist of the present invention is not departed from.

For example, in the real page selection processing of the first, the third, or the fourth embodiments, it would also be acceptable, if no real page is found which satisfies the conditions, to select a real page which is one stage longer. For example, suppose that the length of the compressed write data elements is 511 kB, then although the real page length which complies with the conditions (i.e. the shortest real page length among the real page lengths which are greater than or equal to that of the compressed write data elements) is 512 kB, if it is not possible to select a real page of this type because all of the real pages of length 512 kB are in use, it would be acceptable to select a real page which is one stage longer, for example a real page which has the same length as the virtual page length.

Furthermore, for example, if not only the compressed write data elements, but also information of some other type, such as for example a data integrity code, is added to the data units, in comparisons with the virtual page length or the real page length (for example, in the step S802 of FIG. 8, the step S1001 of FIG. 10, the step S1701 of FIG. 17, and the step S2001 of FIG. 20), the entire length of the data unit is taken as being the subject for comparison. Moreover if, for example as a consequence of the length of the data units being greater than or equal to the virtual page length, a write data element before compression is written to a real page which is the same length as the virtual page length, if the length of the write data element before compression agrees with that of the virtual page, this information of some other type such as a data integrity code or the like is not added, but instead only the write data element before compression is written to the real page. In this case, the reliability of the write data element before compression is guaranteed by using a data integrity code which is included in the write data element before compression (for example, an 8-byte data integrity code may be added to 512 bytes of data).

The invention claimed is:

1. A system, comprising:
a storage system coupled to a host computer, wherein
the storage system includes a plurality of physical disks, and a controller for controlling to read/write data from/to the plurality of physical disks;
wherein the controller is configured to provide a virtual logical unit (LU) to the host computer, wherein storage pool associated with the virtual LU includes an real LU provided with storage areas of the physical disks,
wherein the controller is configured to:
allocate in response to receiving a write request, a first real storage area of the real LU to a virtual storage area in the virtual LU,
store data related to the write request in the first real storage area, and
manage the virtual storage area as an uncompressed virtual storage area,
wherein if a proportion of the uncompressed virtual storage area to the virtual LU exceeds some predetermined threshold value,
the controller compresses the stored data,
allocates a second real storage area of the real LU to the virtual storage area in the virtual LU,
stores the compressed data to the second real storage area, and
manages the virtual storage area as a compressed virtual storage area.

2. A system according to claim 1,
wherein a virtual storage area length is larger than a real storage area length; and
wherein plural real storage areas are allocated on the virtual storage area.

3. A system according to claim 2,
wherein, in a compression process a total real storage area length of the plural real storage areas allocated on the virtual storage area is a total real storage area length that is equal to or larger than a length of the stored data or the data before compression, and where a difference with the length of the compressed data is minimum stored.

4. A system according to claim 1,
wherein, in a compression process, said controller determines whether to store the compressed data in the second real storage area or the stored data before compression in the second real storage area, based on a parameter which is a length of the compressed data.

5. A system according to claim 1, wherein
the storage system is coupled to the management computer,
wherein if the storage system received a command from the management computer,
the controller compresses the stored data,
allocates the second real storage area of the real LU to the virtual storage area in the virtual LU,
stores the compressed data to the second real storage area, and
manages the virtual storage area as the compressed virtual storage area.

6. A system according to claim 1
wherein the pool is composed of plural pool sub areas;
wherein a real storage area length is defined for each pool sub area;
wherein the real storage area length is not defined for an unused pool sub area, wherein the controller:
defines the real storage area length based on a length of the stored data or the compressed data; and
selects a real storage area of a defined real storage area length from the plural pool sub areas whose real storage area length is defined.

7. A system according to claim 6,
wherein the pool is composed of plural actual volumes;
wherein an actual volume is a logical volume based on one or more storage devices;
wherein each actual volume is composed of plural chunks; and
wherein each pool sub area is a chunk.

8. A system according to claim 7,
wherein the controller determines whether all real storage areas composing any pool sub area that is being used are unallocated or not, and when a determination result is "unallocated", a state of a pool sub area that is being used is changed from used to unused.

* * * * *